US012725345B2

(12) United States Patent
Muthler et al.

(10) Patent No.: US 12,725,345 B2
(45) Date of Patent: *Sep. 1, 2026

(54) RAY TRACING HARDWARE ACCELERATION WITH ALTERNATIVE WORLD SPACE TRANSFORMS

(71) Applicant: NVIDIA Corporation, Santa Clara, CA (US)

(72) Inventors: Gregory Muthler, Chapel Hill, NC (US); John Burgess, Austin, TX (US); James Robertson, Austin, TX (US); Magnus Andersson, Skane (SE)

(73) Assignee: NVIDIA Corporation, Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/668,599

(22) Filed: May 20, 2024

(65) Prior Publication Data

US 2024/0303906 A1 Sep. 12, 2024

Related U.S. Application Data

(63) Continuation of application No. 17/669,430, filed on Feb. 11, 2022, now Pat. No. 12,020,367, which is a (Continued)

(51) Int. Cl.

*G06T 15/06* (2011.01)
*G06F 9/50* (2006.01)

(Continued)

(52) U.S. Cl.

CPC ............ *G06T 15/06* (2013.01); *G06F 9/5027* (2013.01); *G06T 1/20* (2013.01); *G06T 15/005* (2013.01);

(Continued)

(58) Field of Classification Search

CPC ......... G06T 15/06; G06T 1/20; G06T 15/005; G06T 15/08; G06T 17/10; G06T 2210/12; G06T 1/60; G06T 2200/28; G06F 9/5027

See application file for complete search history.

(56) References Cited

U.S. PATENT DOCUMENTS

| | | | |
|---|---|---|---|
| 11,282,261 | B2 | 3/2022 | Muthler |
| 2016/0070767 | A1 | 3/2016 | Karras |

(Continued)

FOREIGN PATENT DOCUMENTS

| | | | |
|---|---|---|---|
| CN | 110827385 | A | 2/2020 |
| CN | 110827388 | A | 2/2020 |

(Continued)

OTHER PUBLICATIONS

Chinese Office Action for Application No. 202110631675 dated Jun. 6, 2023, 14 pages.

*Primary Examiner* — Daniel F Hajnik
*Assistant Examiner* — Adeel Bashir
(74) *Attorney, Agent, or Firm* — Nixon & Vanderhye, P.C.

(57) ABSTRACT

Enhanced techniques applicable to a ray tracing hardware accelerator for traversing a hierarchical acceleration structure are disclosed. The traversal efficiency of such hardware accelerators are improved, for example, by transforming a ray, in hardware, from the ray's coordinate space to two or more coordinate spaces at respective points in traversing the hierarchical acceleration structure. In one example, the hardware accelerator is configured to transform a ray, received from a processor, from the world space to at least one alternate world space and then to an object space in hardware before a corresponding ray-primitive intersection results are returned to the processor. The techniques disclosed herein facilitate the use of additional coordinate spaces to orient acceleration structures in a manner that (Continued)

more efficiently approximate the space occupied by the underlying primitives being ray-traced.

22 Claims, 21 Drawing Sheets

Related U.S. Application Data continuation of application No. 16/897,745, filed on Jun. 10, 2020, now Pat. No. 11,282,261.

(51) Int. Cl.
*G06T 1/20* (2006.01)
*G06T 15/00* (2011.01)
*G06T 15/08* (2011.01)
*G06T 17/10* (2006.01)

(52) U.S. Cl.
CPC .............. *G06T 15/08* (2013.01); *G06T 17/10* (2013.01); *G06T 2210/12* (2013.01)

(56) References Cited

U.S. PATENT DOCUMENTS

2016/0070820 A1* 3/2016 Laine ...................... G06T 9/001 707/797
2016/0071313 A1 3/2016 Laine
2016/0292908 A1 10/2016 Obert
2017/0116760 A1* 4/2017 Laine ...................... G06T 9/001
2019/0088002 A1 3/2019 Howson
2019/0318530 A1 10/2019 Hunt
2020/0050451 A1* 2/2020 Babich .................. G06F 9/3004
2020/0051317 A1 2/2020 Muthler

FOREIGN PATENT DOCUMENTS

CN 110827389 A 2/2020
KR 20160029601 A 3/2016
KR 20160038640 A 4/2016
WO WO-2019183664 A1 * 10/2019 ........... H04N 21/236

* cited by examiner 120
110
104

Example Ray Tracing Shading Pipeline

FIG. 10 TRAVERSAL COPROCESSOR

TTU Processing

Example Process To Generate an Image

RAY TRACING HARDWARE ACCELERATION WITH ALTERNATIVE WORLD SPACE TRANSFORMS

CROSS-REFERENCE TO RELATED PATENTS AND APPLICATIONS

This application is a continuation of U.S. application Ser. No. 17/669,430 filed Feb. 11, 2022, which is continuation of U.S. application Ser. No. 16/897,745 filed on Jun. 10, 2020, now U.S. Pat. No. 11,282,261 issued on Mar. 22, 2022, the entire content of which is herein incorporated by reference. This application is also related to the following commonly-assigned US patents and patent applications, the entire contents of each of which are incorporated by reference:

U.S. application Ser. No. 14/563,872 titled "Short Stack Traversal of Tree Data Structures" filed Dec. 8, 2014;

U.S. Pat. No. 9,582,607 titled "Block-Based Bounding Volume Hierarchy";

U.S. Pat. No. 9,552,664 titled "Relative Encoding For A Block-Based Bounding Volume Hierarchy";

U.S. Pat. No. 9,569,559 titled "Beam Tracing";

U.S. Pat. No. 10,025,879 titled "Tree Data Structures Based on a Plurality of Local Coordinate Systems";

U.S. application Ser. No. 14/737,343 titled "Block-Based Lossless Compression of Geometric Data" filed Jun. 11, 2015;

U.S. patent application Ser. No. 16/101,066 titled Method for Continued Bounding Volume Hierarchy Traversal on Intersection Without Shader Intervention;

U.S. patent application Ser. No. 16/101,109 titled "Method for Efficient Grouping of Cache Requests for Datapath Scheduling";

U.S. patent application Ser. No. 16/101,247 titled "A Robust, Efficient Multiprocessor-Coprocessor Interface";

U.S. patent application Ser. No. 16/101,180 titled "Query-Specific Behavioral Modification of Tree Traversal";

U.S. patent application Ser. No. 16/101,148 titled "Conservative Watertight Ray Triangle Intersection";

U.S. patent application Ser. No. 16/101,196 titled "Method for Handling Out-of-Order Opaque and Alpha Ray/Primitive Intersections"; and U.S. patent application Ser. No. 16/101,232 titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. The example non-limiting technology herein also relates to efficient ray-bounding volume tests that transform the coordinate space to better fit objects within bounding boxes.

BACKGROUND & SUMMARY

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $1/30^{th}$ or $1/60^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics-namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster “hacks”. Ray tracing may also be used as the basic technique to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU’s have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., “OptiX: A General Purpose Ray Tracing Engine” (ACM Transactions on Graphics, Vol. 29, No. 4, Article 66, July 2010). In addition to improvements in API’s (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US 20160070820; US 20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume 110 including geometric mesh 120. FIG. 1A shows a ray 102 in a virtual space including bounding volumes 110 and 115. To determine whether the ray 102 intersects geometry in the mesh 120, each geometric primitive (e.g., triangle) could be directly tested against the ray 102. But to accelerate the process (since the object could contain many thousands of geometric primitives), the ray 102 is first tested against the bounding volumes 110 and 115. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 110, any geometry of mesh 120 within that bounding volume need not be tested for intersection. While bounding volume 115 is intersected by the ray 102, bounding volume 115 does not contain any geometry and so no further testing is required.

On the other hand, if a ray such as ray 104 shown in FIG. 1B intersects a bounding volume 110 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 110 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 110, it does not intersect any of the geometry the bounding volume encloses (alternatively, as mentioned above, bounding volume 110 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 110 and contains geometry that ray 106 intersects. To perform real time ray tracing, an intersection tester tests each geometric primitive within the intersected bounding volume 110 to determine whether the ray intersects that geometric primitive.

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

NVIDIA's RTX platform includes a ray tracing technology that brings real-time, cinematic-quality rendering to content creators and game developers. See https://developer.nvidia.com/rtx/raytracing. In many or most implementations including NVIDIA RT Cores, the bounding volumes such as shown in FIG. 1A-1C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 1A-1C show, a hierarchy of AABB's is created to increase the culling effect of a single AABB bounding box test. This allows for efficient traversal and a quick reduction to the geometry of interest.

DETAILED DESCRIPTION OF NON-LIMITING EMBODIMENTS

Many ray tracing accelerators, including RTX and DXR, use axis-aligned bounding boxes (AABB) in a bounding volume hierarchy (BVH) that is the basis of the acceleration data structure (also referred to herein as "acceleration structure" or "AS") used for traversal. AABBs are used because they are easy to express compactly and can be quickly evaluated for ray-intersection tests. The AABB encompasses the underlying geometry and a hit or miss on that AABB determines whether or not to descend further into its child AABBs.

One problem with AABB is that because it is axis-aligned it sometimes does not fit the underlying geometry as well as an oriented bounding box (OBB) might. In that case, the AABB introduces empty space that results in false hits and wasted traversal steps.

Multi-level hierarchies are a common technique to reduce that impact. A multi-level hierarchy typical uses a combination of singular world space (e.g. the coordinate space the developer specifies for the application) and multiple object spaces. The object spaces are defined per object and can more tightly fit the geometry of that object without taking into account some arbitrary rotation in world space. Traversal in that object space then can have far fewer false hits due to better fit AABBs. All of those objects are then placed into a common world space with associated transforms to translate from the world space into the respective object spaces.

However, that common world space can still have the ill-fitting AABB problem. In some cases, that could be solved by choosing a different world space orientation, but sometimes a different choice does not fit into the developers workflow or there may not be one single world space orientation that works efficiently for all locations in the particular world.

Figure 2A:
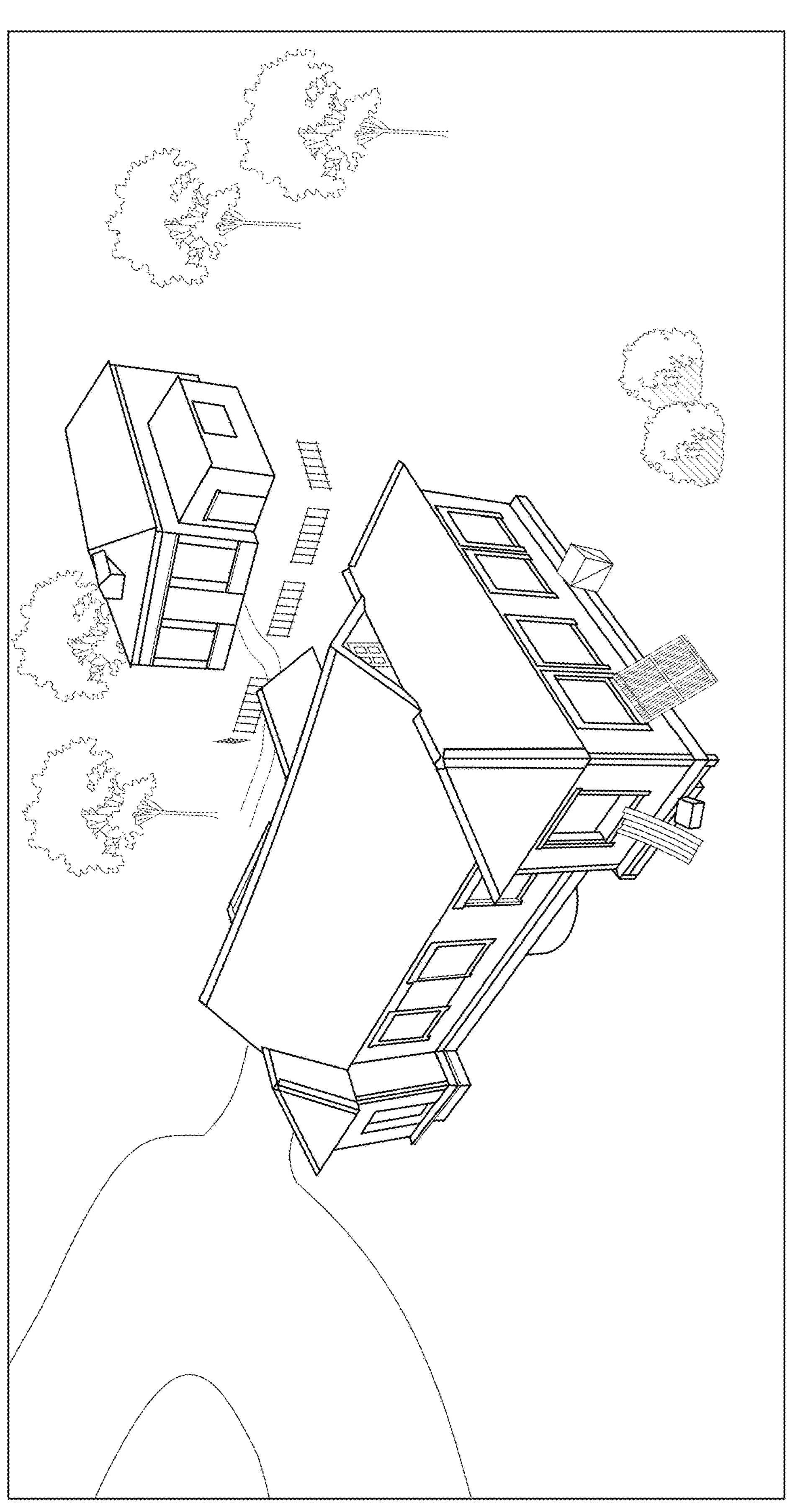
FIGS. 2A and 2B are line drawings of an example scene as seen by a user during a virtual game and the same scene in a top-down view, respectively.
Figure 2B:
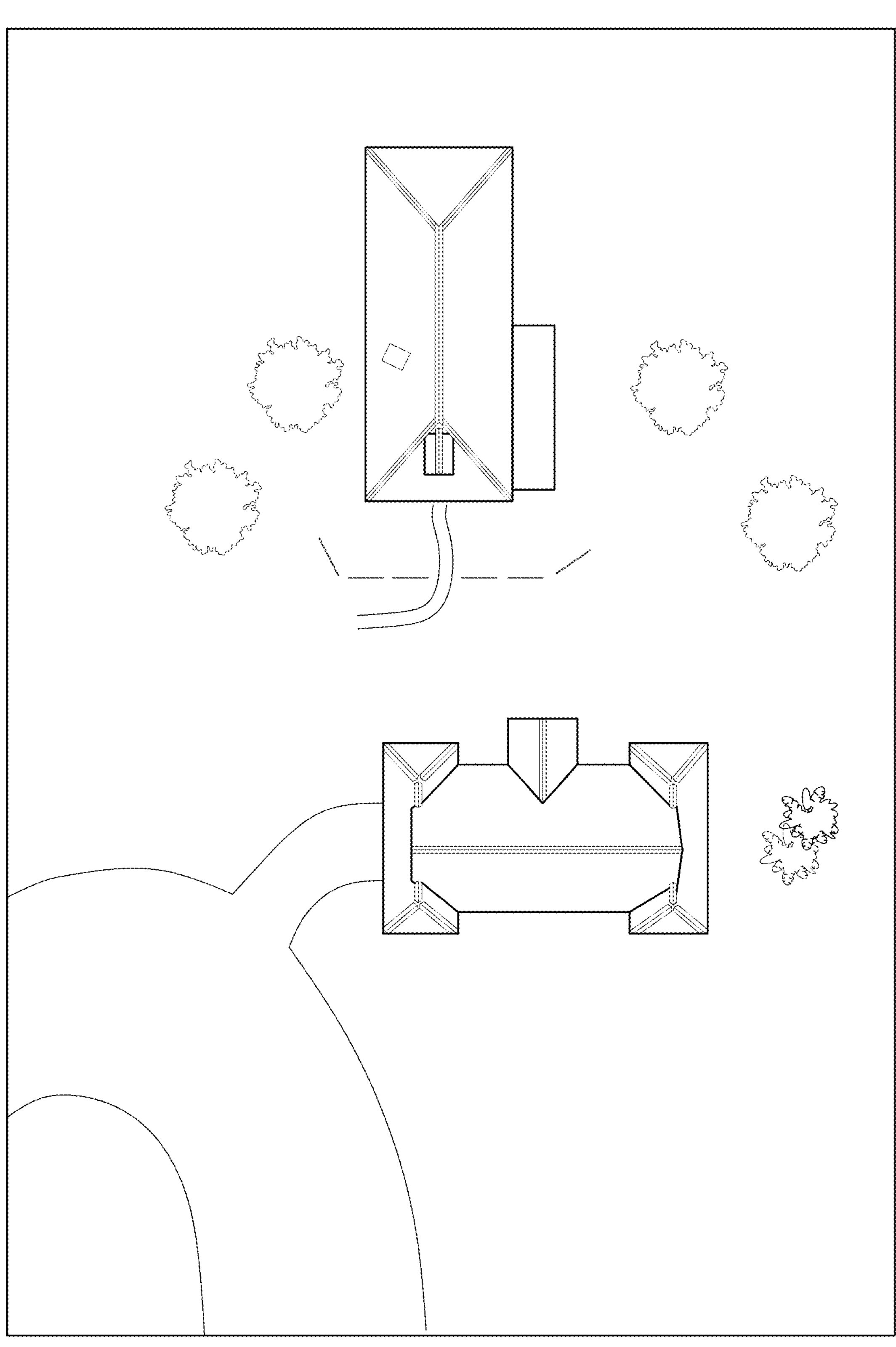
Figure 2C:
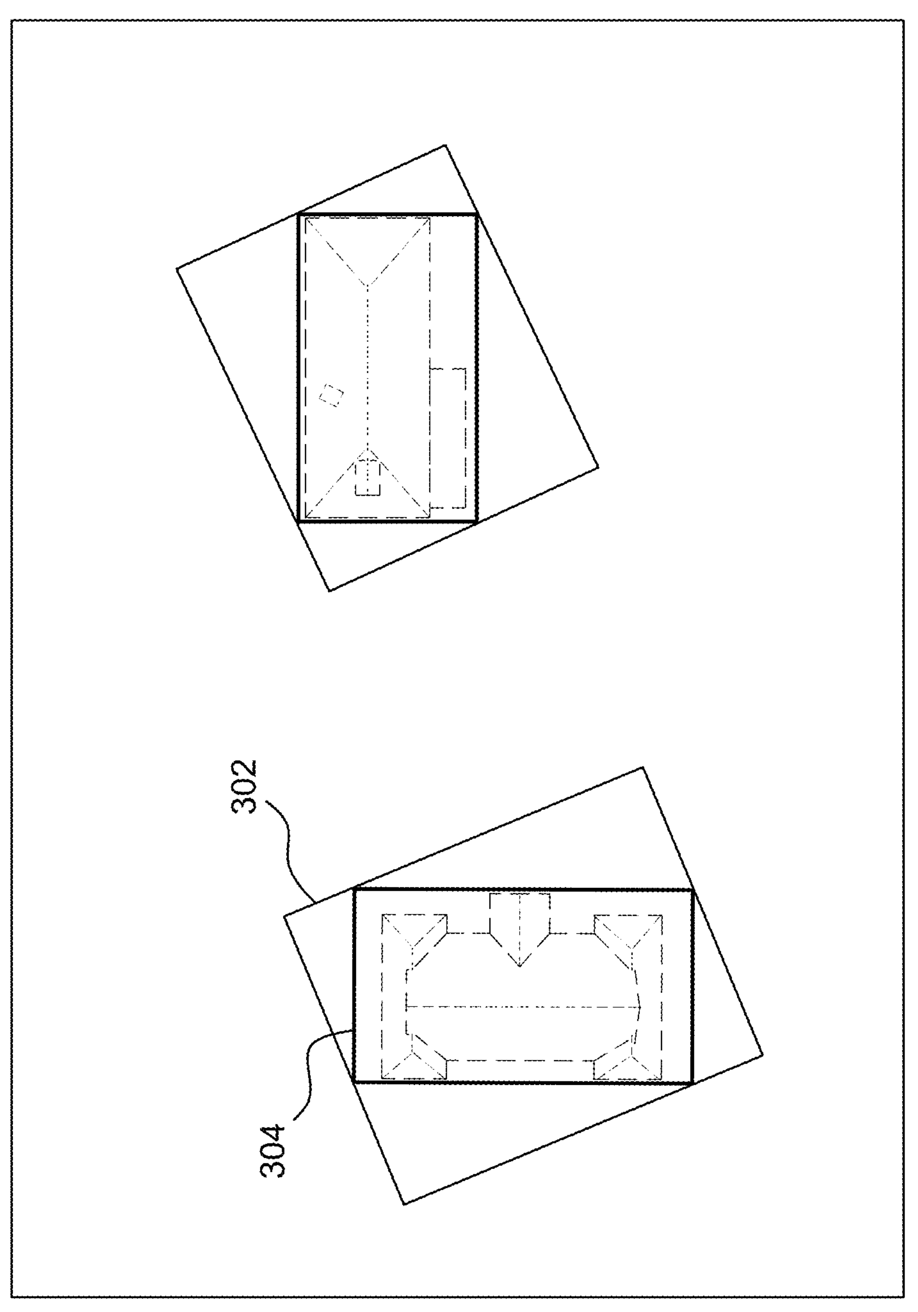
FIG. 2C illustrates example bounding volumes for certain objects in the scene in the view of FIG. 2A and the top-down view of FIG. 2B.

For example, see FIGS. 2A and 2B showing two buildings in an example village scene in a virtual world. FIG. 2A shows the scene as the user might witness it from a user's perspective view. FIG. 2B shows the scene from above (bird's eye view) where it seems well suited to be aligned to a grid. FIG. 2C shows an example bounding box 304 for one of the buildings according to the alternative bird's eye view world space orientation of FIG. 2B. A bounding box 302 that would encompass the same building in the user-perspective world space of FIG. 2A is overlaid in FIG. 2C for comparison. It can be clearly seen that the bounding box 304, which has substantial empty space in the world space of FIG. 2A, can instead be represented by the bounding box 304 which has much less empty space, if the alternative world space orientation of FIG. 2B were chosen.

The developer, during BVH development, may prefer not to change the world space for a particular scene even if it appears that the world space is inefficient for that particular scene because of reasons such as, for example, that world space being shared with another location. Also, in some scenes, a particular world to be displayed cannot be aligned to any one single grid that is most efficient.

Some embodiments herein provide for changing the world space of an acceleration structure "on the fly" for selected frames of a series of frames being rendered for a particular application such as, for example, a virtual scene displayed in a real time graphics application. In particular, some embodiments enable the use of an alternate world space that provides for AABBs that more tightly fit objects in the scene in order to reduce false hits that would have resulted if the scene were to be traversed in the original world space during ray tracing. The use of an alternate world space for selected frames may be performed "under the hood" such that the selection of frames or scenes of an application for which the alternate world space is used is transparent to the developer of the application, or, in some embodiments, based on configurations set by the developer. Moreover, some embodiments provide for hardware-accelerated traversal of acceleration structures that include traversal paths of two or more coordinate spaces.

Figure 3:
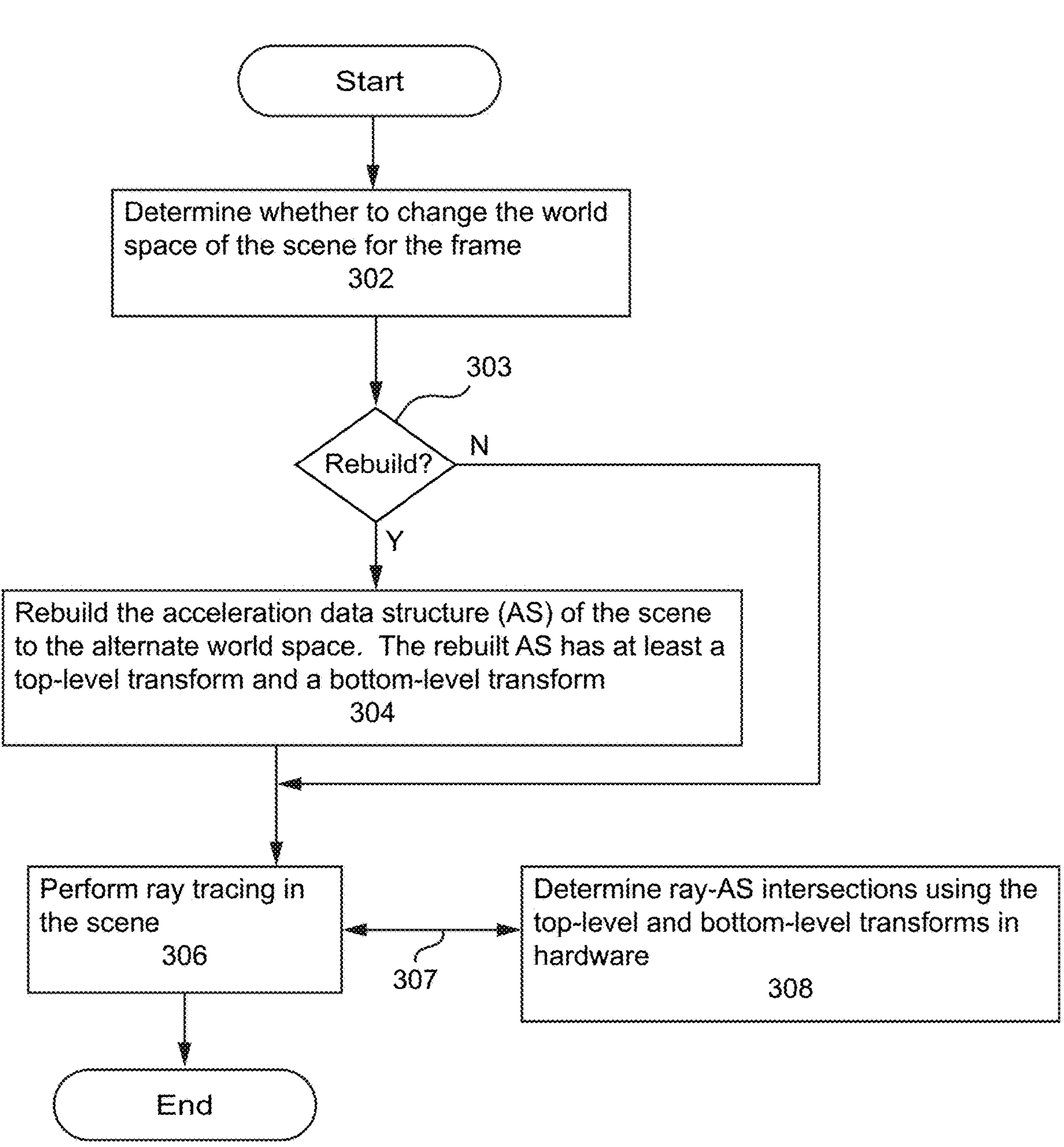
FIG. 3 shows an example process for changing the world space of a scene to an alternate world space in order to improve efficiency of ray tracing, in accordance with some embodiments.

FIG. 3 shows an example process 300 for changing the world space of a scene to an alternate world space in order to improve efficiency of ray tracing, in accordance with some embodiments. Process 300 may be performed for every nth frame where n is an integer greater than 0, or for frames selected at some irregular interval.

At step 302, 303, it is determined whether the current world space of the scene should be changed. This determination may be based on dynamically detected characteristics of the virtual world and/or the scene as viewed by the user or camera.

For example, in some embodiments, the system (e.g. CPU and/or GPU in FIG. 7) may automatically observe that an acceleration structure (AS) corresponding to a scene has a majority (or a configurable percentage) of AABBs in the scene at an angle such as 45 degrees, or have a substantial portion (e.g. a configurable percentage) of its volume as free space, and may determine an alternate world space that is expected to improve the alignment and fit of the AABBs to the scene. In one embodiment, the alternate world space to be used can be determined by a brute force approach such as, for example, automatically, at every Nth frame (N being a nonzero positive integer), rotating or performing one or more other predetermined transforms on the acceleration structure for the scene and based on the performance information of traversals, such as, for example, false hit percentage, select the rotation or the other one or more predetermined transforms which yields the least false hit percentage or the like. The rotation or the other one or more predetermined transforms which yields the least false hit percentage can then be used for improved traversal performance for a predetermined number of frames.

In some embodiments, a heuristic-approach such as, for example, identifying an orientation which provides the least free space in the AABBs of the scene can be used.

In some embodiments a static technique such as, for example, preprocessing all the scenes in the application to determine, based on a predetermined criteria, scenes that may benefit from an alternate world space, can be used. A flag may be set in the data and/or corresponding acceleration structures for the scenes so identified. While static approaches may not always adequately capture the effects of certain ray behaviors, such as, for example, bouncing off of surfaces at non-uniform angles that can be captured with dynamic approaches in selecting a suitable alternate world space, static approaches can be valuable in many situations depending on the particular applications. Some embodiments may use a combination of static and dynamic approaches.

In some embodiments, the transform from a world space to an alternate world space is a rotation. However, in example embodiments the transform is not limited to rotations and may include any affine transform such as, for example, geometric contraction, expansion, dilation, reflection, rotation, shear, similarity transformations, spiral similarities, translation, non-uniform scaling, and any combination of affine transforms.

Figure 4:
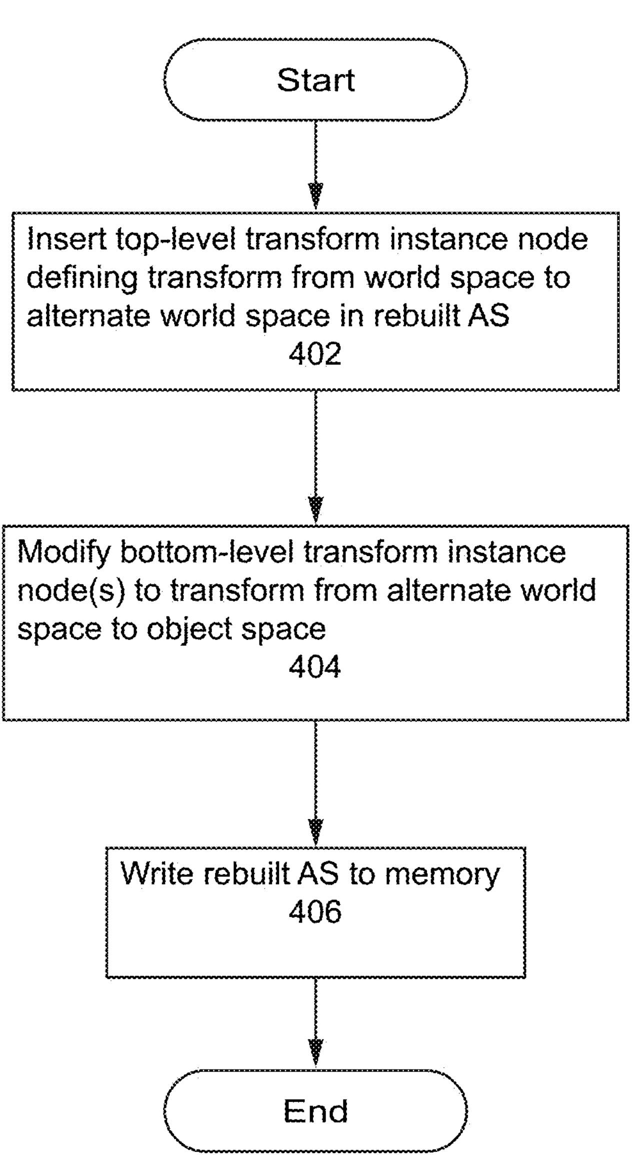
FIG. 4 shows an example process for (re)building an acceleration data structure to include a top-level transform from a world space to an alternate world space, in addition to bottom-level transform(s) to object-space(s), according to some embodiments.

When it is determined at step 303 that the coordinate system for the scene should be changed from the world space of the application to an alternate world space, at step 304, the acceleration structure is (re)built to include at least a part of the acceleration structure that is (re)oriented to the alternate world space. The (re)built acceleration structure, according to some embodiments, includes some traversal paths with two, and sometimes more than two, coordinate spaces to which the bounding boxes and the geometry are aligned. As also noted elsewhere herein, a BVH is one example acceleration structure that may be used in embodiments but other acceleration data structures and associated bounding volumes are possible. The (re)built acceleration structure constructed by block 304 is expected to reduce false positives due to the better alignment and fit of its AABBs to the geometry. FIG. 4 described below includes further description of step 304.

Figure 5:
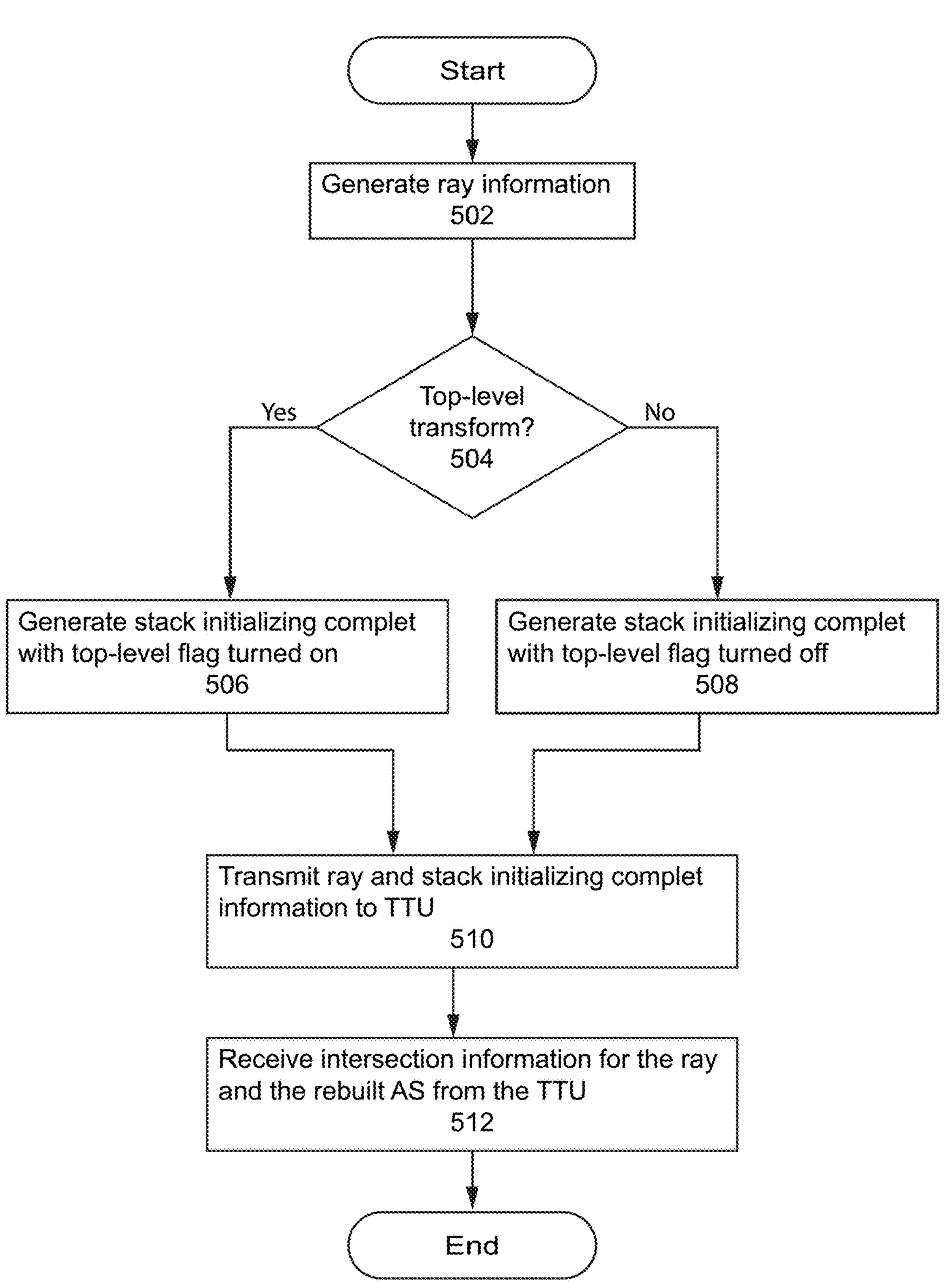
FIG. 5 shows an example process for a parallel processing unit to perform hardware-accelerated ray tracing when some scenes are represented by acceleration data structures with multiple levels of transforms, according to some embodiments.
Figure 18:
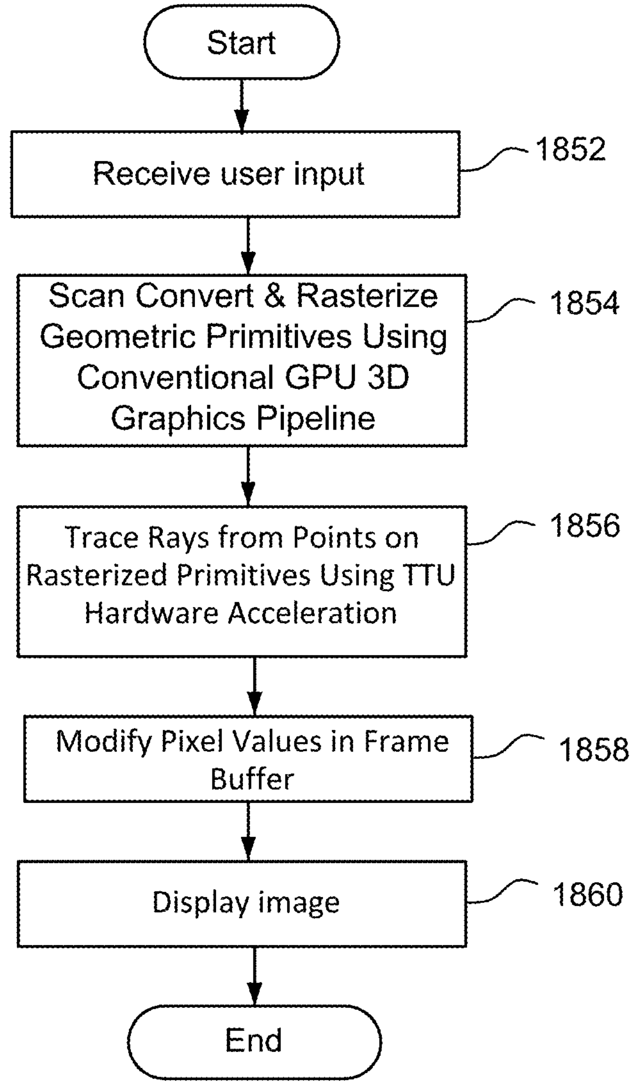
FIG. 18 is a flowchart of an example process to generate an image, according to some embodiments.

Meanwhile, at step 306 ray tracing is performed using the (re)built acceleration structure constructed by block 304, while using hardware-acceleration in step 308 to traverse the (re)built acceleration structure using the alternate world space in order to determine ray intersections. In some embodiments, step 306 may be performed in a software-based processor such as a streaming multiprocessor (SM) 732 with the hardware acceleration of traversal occurring in hardware such as a traversal coprocessor (TTU) 738. Communication steps 307 between the SM 732 and TTU 738 enable the SM to provide ray and (re)built acceleration structure information to the TTU, and for the TTU to provide information about the determined intersections to the SM. FIG. 5 and other figures describe the ray tracing in more detail. The information about the determined ray intersections, including those intersection determined at step 306, is provided to be used in the rendering of the scene in a process for generating an image as shown in FIG. 18.

Accordingly, some embodiments provide for taking a scene and rays being cast at the scene by the application and, transparently to the developer of the application, improve the efficiency of ray tracing for the scene by transforming the rays to an alternate world space that reduces false positive hits with AABBs during traversal of the acceleration structure for that scene. As noted above, this optimization can be automatically and dynamically performed for selected individual frames or sequences of frames in a series of frames that are otherwise traversed by default in a world space.

In some embodiments, as described in relation to step 302, this optimization may be performed based on dynamically determined criteria. In some embodiments, the optimization may be performed based at least in part upon a configuration setting. For example, the developer may set a predetermined flag indicating whether or not an alternate world space is to be used for particular scenes. The decision of whether to use an alternate world space can thus be determined manually, automatically or by a combination of manual and automatic criteria.

An alternative solution to performing the multiple transforms in hardware (e.g. in the TTU 738) would be to explicitly transform the ray on the processor (e.g. SM 732) before starting the ray query. Using the TTU 738 for the transform instead of the SM 732, as in example embodiments, may result in: lower latency from initial transform until traversal begins since only one ray may be required to be transformed in the TTU 738 whereas in some embodiments the SIMT nature of SMs 732 requires all rays to be transformed before the traversal begins; reducing SM register pressure for traversal kernels (since neither the transformed ray nor transformation matrix need to be stored in registers during the transformation); and providing an increased opportunity for the SM to work on non-traversal aspects of a kernel (and thus improving application performance) while traversal is occurring.

Moreover, the multilevel ray transform as used in example embodiments allows driver or other software to add a non-API visible transform to any ray traced content. This has the potential for providing a performance benefit for cases where a developer is unwilling or unable to modify their application by having tighter bounding boxes throughout certain levels, such as, for example, the top level in a two level BVH, of traversal, and provides additional convenience in that the ray tracing system can automatically optimize BVH traversal without the developer needing to be concerned about such issues.

According to some embodiments, multilevel ray transform could also be added explicitly to certain APIs (e.g., Optix, VulkanRT, DXR) to enable hardware support for multiple transforms occurring along a traversal path. In this way, the development computing devices that create the BVH can, based on developer direction and/or automatically, generate BVH's and associated ray instructions to take advantage of the efficiencies provided by multilevel transforms.

FIG. 4 shows an example process 400 for (re)building an acceleration data structure to include multiple levels of transforms. For example, process 400 may be used to add a top-level transform from a world space to an alternate world space in addition to bottom-level transform(s) to object-space(s), according to some embodiments. As one example, process 400 may be called by an acceleration structure builder program during the processing of process 300 step 304 described above in connection with FIG. 3. In typical image generation pipelines, the acceleration structure is (re)built for every frame. As described below in relation to FIGS. 6A and 6B, the acceleration structure may comprises a top level acceleration structure (TLAS) defining geometry and bounding volumes in world space, and a bottom level acceleration structure (BLAS) defining geometry and bounding volumes in object space. The acceleration structure (re)building often or typically involves changes to the TLAS to accommodate movements of objects in/out of the scene and movements within the scene, while mostly keeping the BLAS the same. In many cases, the acceleration structure (re)building may not include or require changes to the majority of the TLAS and may include a "refitting" of a modified portion into the rest of the TLAS.

In step 402, the acceleration structure, or more specifically the TLAS, is (re)built by inserting an instance node as the parent of the root node of the TLAS and (re)building the TLAS in the selected alternate coordinate space (e.g., an alternate world space). In an embodiment, this involves (re)aligning top level AABBs to the alternate world space, which may be selected in any number of ways as discussed above. In FIG. 6B, for example, the root of the TLAS N1 is attached with an instance node N1' as its parent. In one embodiment, the new instance node, unlike the instance nodes that may be inserted between the TLAS and the BLAS, specifies a transform from the (default or initial) world space defined by the application to a selected different, alternate world space. A transform from the world space to an alternate world space is referred to herein as a "top level transform" and the instance node specifying the top level transform may be referred to as a "top level instance node". In some embodiments, a top-level transform uses the same instance node format as the instance nodes specifying the transform to object space(s) (i.e., the fields used in legacy formats to specify a transform from world space to object space may now be repurposed to specify a transform from world space to an alternate world space), but may have fields other than the transform matrix values ignored.

In step 404, each of the instance nodes specifying a transform from the TLAS to a BLAS object space is modified to specify a transform from the selected alternate world space to the object space. In some embodiments, in order to achieve compactness, this modification may overwrite the transform from world space to the object space originally specified in the instance node. No additional changes may be required in the BLAS. In other embodiments, it may be desirable to retain the original transform from world space to object space in the instance nodes and to add an additional field(s) specifying a transform from alternate world space to object space and/or a transform from world space to alternate world space.

The modifications to the acceleration structure described in steps 402 and 404 may be after the scene is (re)built for a particular frame in the world space of the application. An acceleration structure modified according to steps 402 and 404 may have at least two transforms specified along some traversal paths, and may include at least two coordinate spaces in addition to the world coordinate space specified for the application.

After the changes to the acceleration structure to accommodate the alternate world space are made, the (re)built acceleration structure is written to memory at step 406. In some implementations, the (re)built acceleration structure may or may not overwrite the original acceleration structure. In some example embodiments, the building/rebuilding of the acceleration structure, which is stored in the memory 740, may be performed by processor 720 and/or parallel processing unit 730.

FIG. 5 shows an example process 500 for a parallel processing unit (PPU) to perform hardware-accelerated ray tracing when some scenes are represented by acceleration data structures with multiple levels of transforms, according to some embodiments. Process 500 may be performed on a parallel processing unit. For example, process 500 may be performed by the SM 732. More particularly, process 500 may be used each time a group of rays are launched to traverse an acceleration structure. In some embodiments, process 500 may be used to relaunch the traversal by one or more rays.

At step 502 one or more rays are generated. The information generated for each ray includes at least a ray origin point and a ray direction. The information generated for each ray may include the ray's geometric parameters, traversal state, and the ray's ray flags, mode flags and ray operations information.

At step 504, it is determined that the acceleration structure to be traversed has a root node which is an instance node specifying a top level transform of the space. For example, as described in relation to FIGS. 3 and 4, upon a determination that an alternate world space is to be used for one or more frames, the acceleration structure may have been (re)built to orient the AABBs in the top level acceleration structure in an alternate world space and to associate the root of that top level acceleration structure with a top level instance node specifying the transform from the world space to the alternate world space.

If it is determined at step 504, that the root node of the acceleration data structure to be traversed specifies a top level transform, then, at step 506, a stack initialization structure is generated with an indication to that effect. In some embodiments, a stack initialization structure (e.g. a "stack init complet") according to a predetermined format is constructed in which a top level transform flag is turned on. For example, a stack init complet 1502 such as that shown in FIG. 15 can be constructed with the top level transform flag 1504 being set to "on" (e.g., setting the bit corresponding to the top level transform flag equal to 1). Alternatively, when it is determined that the root node of the acceleration data structure to be traversed does not specify a top level transform, then, at step 508, a complet ("complet" or compressed treelet is described below) is generated to traverse the acceleration structure in the world space. For example, at step 508, a stack init complet 1502 can be constructed with the top level transform flag 1504 being set to "off" (e.g., setting the bit corresponding to the top level transform flag equal to 0).

At step 510, the generated ray information and the stack information are transmitted to the traversal coprocessor.

Figure 12A:
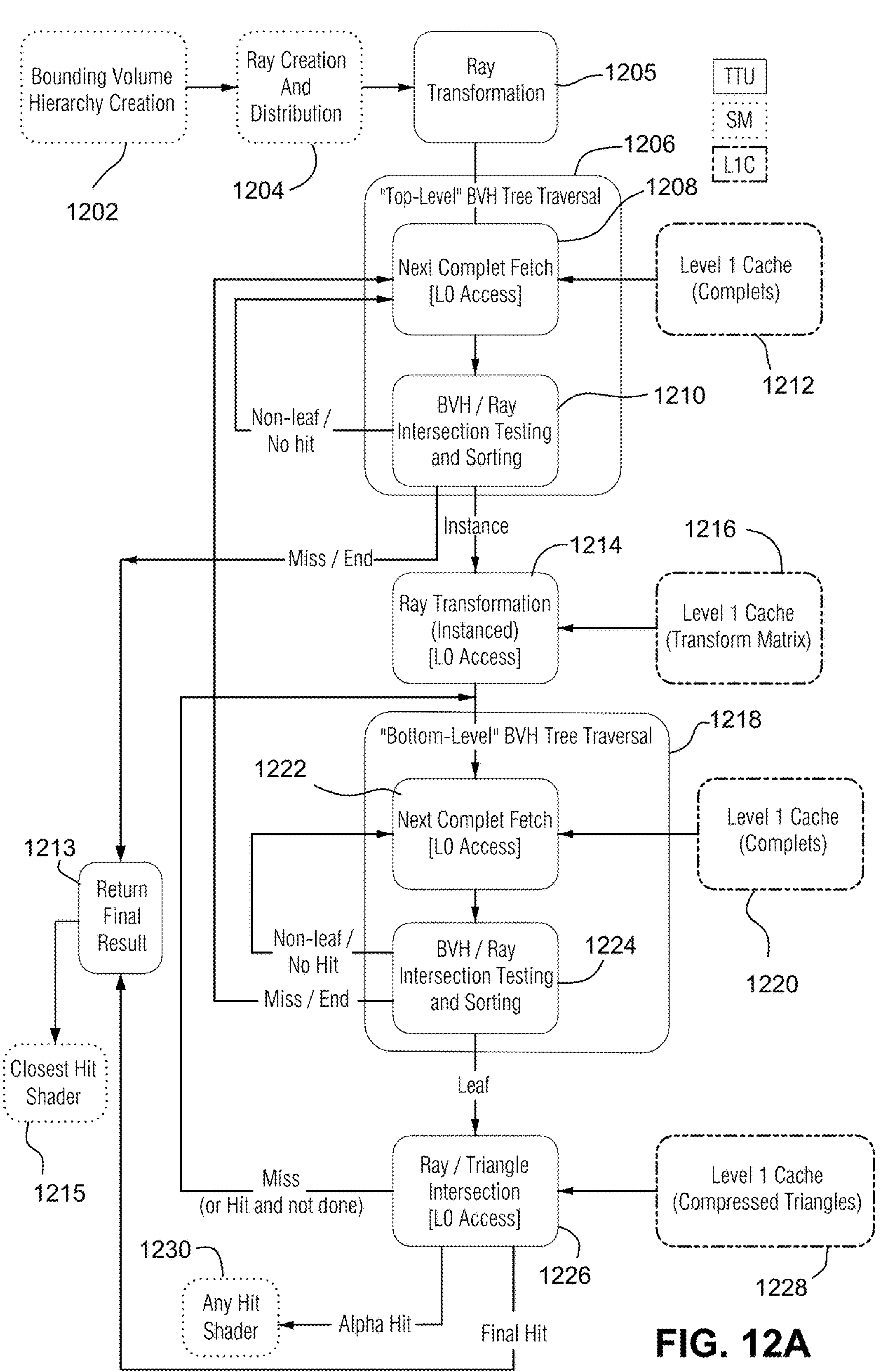
FIGS. 12A and 12B illustrate more detailed ray tracing pipelines, according to some embodiments.
Figure 12B:
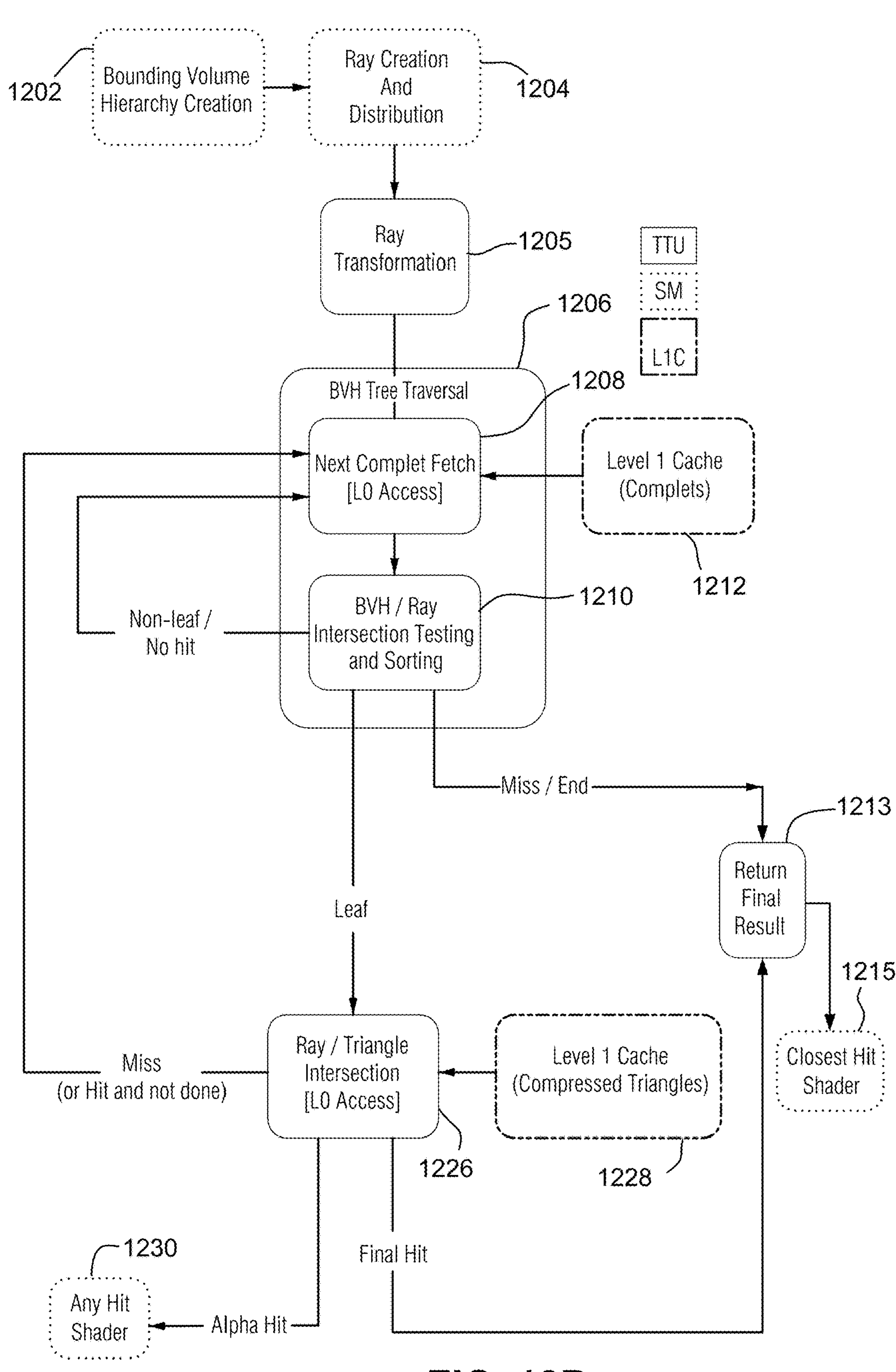

The traversal of the accelerated data structure, performed on the traversal coprocessor, based on the ray information and stack information provided at step 510 is described in relation to FIGS. 12A-B. The ray intersection information returned from the traversal coprocessor is used for rendering the scene. The rendering of the scene using the intersection information is described below (e.g. step 1858) in relation to the example process of generating an image shown in FIG. 18.

The description above in relation to FIGS. 2 to FIG. 5 concerns providing an acceleration structure to include, in addition to the world space and object spaces, an alternate world space. Some embodiments, however, provide for the use of two or more coordinate spaces within any traversal path in either TLAS or the BLAS. In some embodiments, for example, a traversal path in the acceleration structure may include three transforms—from the world space to a first alternate world space, from the first alternate world space to a second alternate world space, and from the second alternate world space to an object space. In this example, the TLAS includes three coordinate spaces—the world space, the first alternate world space and the second alternate world space. An example embodiment providing for traversal paths with more than 2 levels of transforms is described in relation to FIG. 17. Other embodiments may provide N alternate world spaces, where N is any integer.

Building a Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on streaming multiprocessors (SMs) (e.g. SM 732) and/or CPU (e.g. CPU 120) and/or other development systems e.g., during development of an application.

The first stage in BVH acceleration structure construction acquires the bounding boxes of the referenced geometry. This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that present poor fits with respect to the geometry they contain.

This process continues until all bounding volumes containing geometry have been sufficiently subdivided to provide a reasonable number of geometric primitives per bounding box. The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets ("complets") is written out into a data structure in memory for later use by the graphics processing hardware/software during e.g., real time graphics processing that includes real time ray tracing.

Figure 6A:
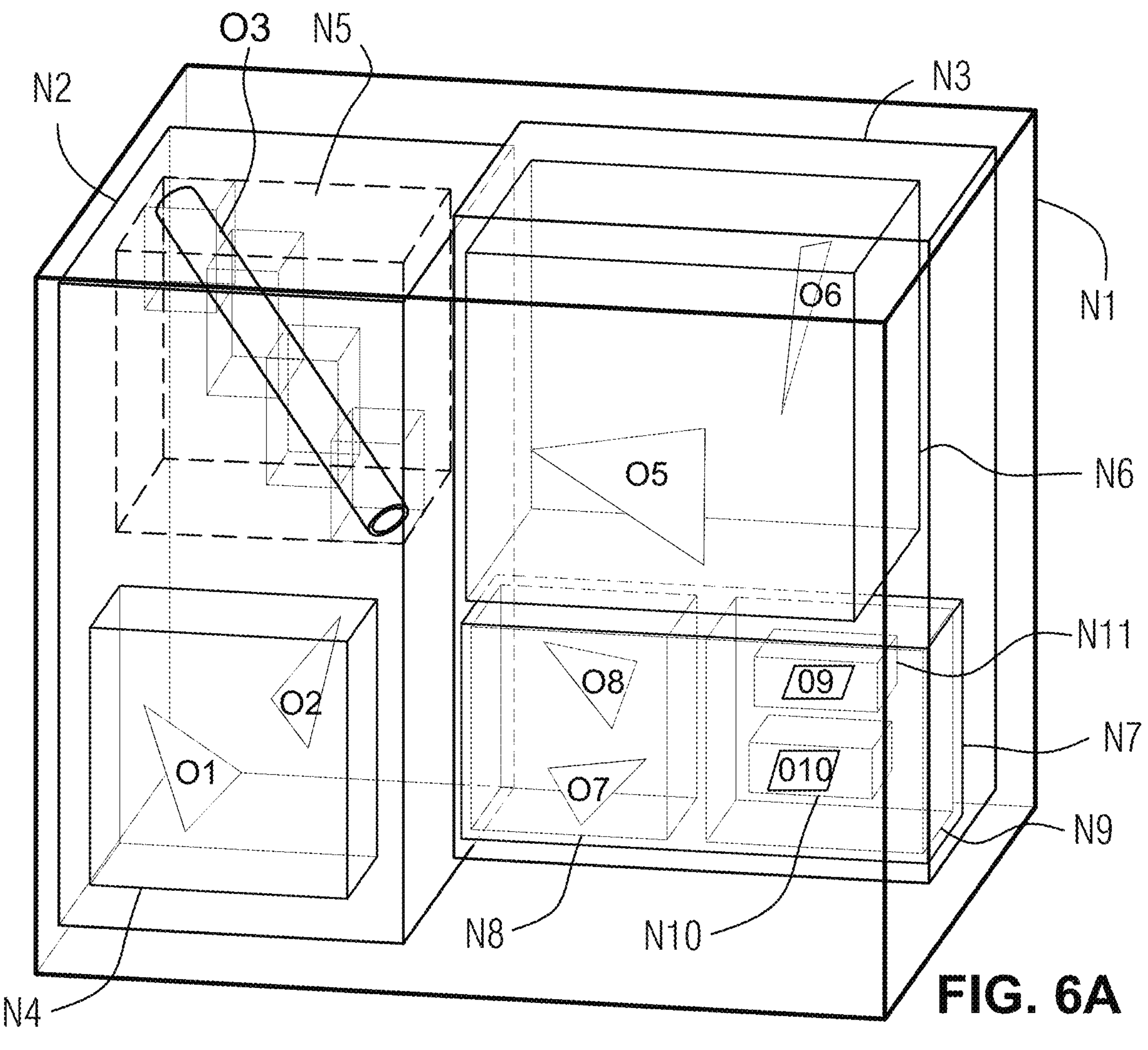
FIGS. 6A and 6B show example bounding volume hierarchy representations, according to some embodiments.
Figure 6B:
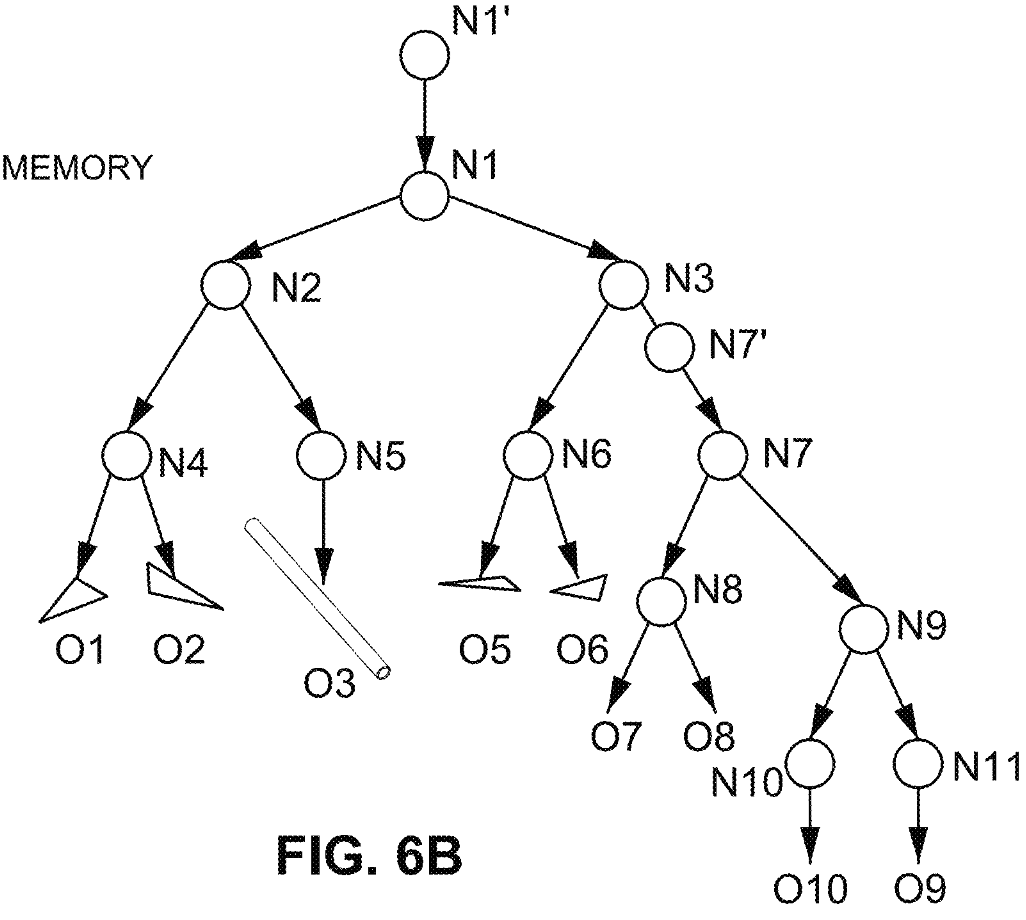

FIGS. 6A and 6B show a recursively-subdivided bounding volume of a 3D scene (FIG. 6A) and a corresponding tree data structure (FIG. 6B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 6A, bounding volume N1 is subdivided into bounding volumes N2 and N3. Children nodes N2 and N3 of the tree structure of FIG. 6B correspond to and represent the bounding volumes N2 and N3 shown in FIG. 6A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 6B tree structure correspond to and represent the FIG. 6A bounding volumes N4, N5, N6, N8, N10 and N11 in space.

The FIG. 6B tree in this particular example is only three to six levels deep so that volumes N4, N5, N6, N8, N10 and N11 constitute "leaf nodes"—that is, nodes in the tree that have no child nodes. FIG. 6A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 6A further shows that leaf node bounding volume N5 contains a single cylinder O3 such as shown in that does not provide a good fit for the AABB bounding volume N5 shown in dotted lines. Accordingly, in an example non-limiting embodiment herein, instead of using the larger AABB bounding volume N5 for the ray-bounding volume intersection test, TTU 738 instead tests the ray against a plurality of smaller AABB bounding volumes that are arranged, positioned, dimensioned and oriented to more closely fit cylinder O3.

The tree structure shown in FIG. 6B represents these leaf nodes N4, N5, N6, and N7 by associating them with the appropriate ones of primitive O1-O8 of the scene geometry. To access this scene geometry, the TTU 738 traverses the tree data structure of FIG. 6B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space, world coordinate space) to the coordinate space of N7 etc. (e.g., object space, object coordinate space).

In some embodiments, the tree or subtree rooted at N1 is associated with a parent node N1' that is an instance node. Instance node N' may contain, or may be associated with a transform for transforming a ray from a one coordinate space to another coordinate space. In some embodiments, N' may specify a transform from the world space to an alternative world space and may be referred to as a "top level instance node".

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 738 that accelerates certain processes supporting interactive ray tracing including ray-bounding volume intersection tests, ray-primitive intersection tests and ray "instance" transforms for real time ray tracing and other applications.

Example System Block Diagram

Figure 7:
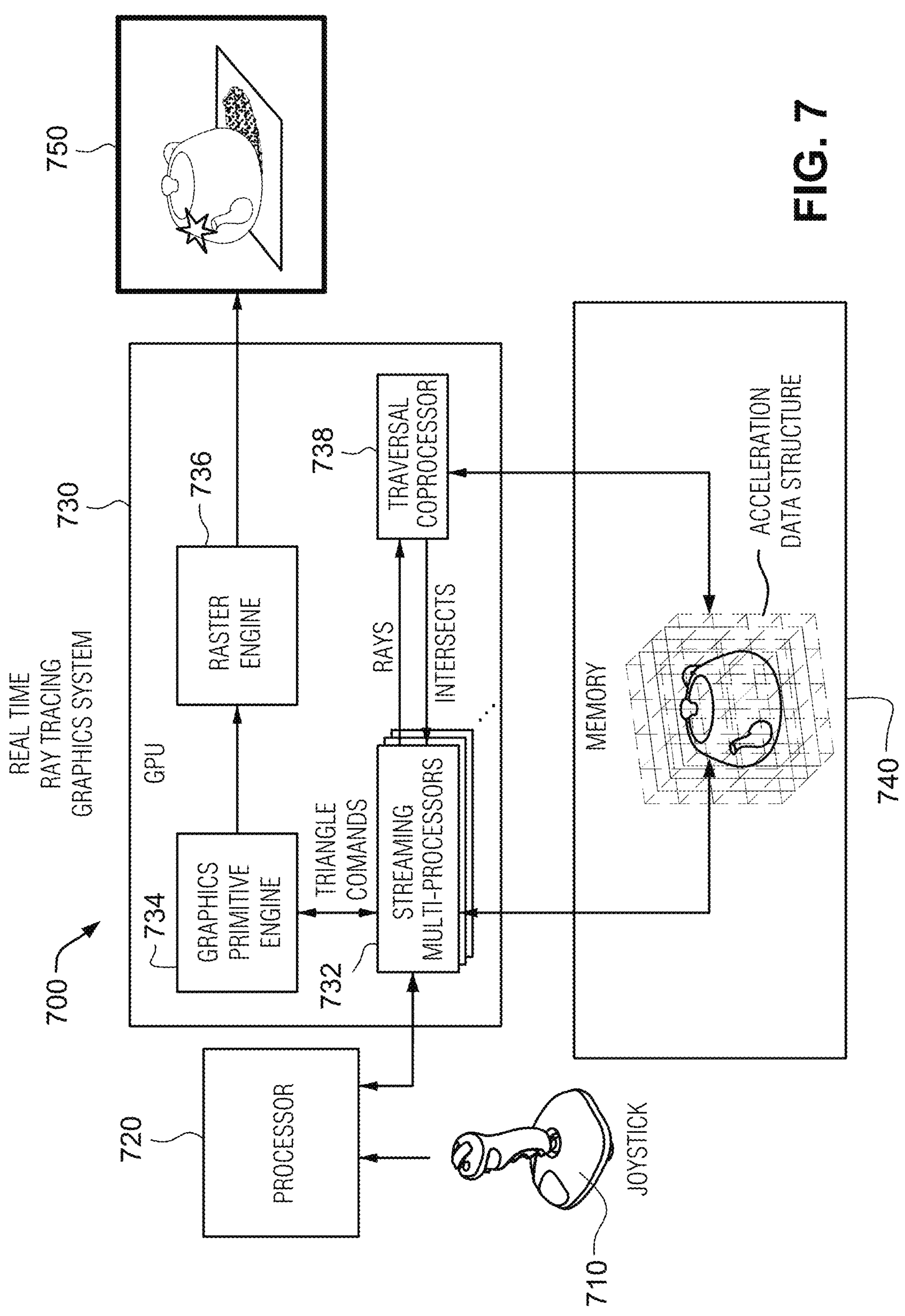
FIG. 7 illustrates an example non-limiting ray tracing graphics system according to some embodiments.

FIG. 7 illustrates an example real time ray interactive tracing graphics system 700 for generating images using three dimensional (3D) data of a scene or object(s) including the acceleration data structure constructed as described above.

System 700 includes an input device 710, a processor(s) 720, a graphics processing unit(s) (GPU(s)) 730, memory 740, and a display(s) 750. The system shown in FIG. 7 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 720 may be a multicore central processing unit (CPU) operable to execute an application in real time interactive response to input device 710, the output of which includes images for display on display 750. Display 750 may be any kind of display such as a stationary display, a head mounted display such as display glasses or goggles, other types of wearable displays, a handheld display, a vehicle mounted display, etc. For example, the processor 720 may execute an application based on inputs received from the input device 710 (e.g., a joystick, an inertial sensor, an ambient light sensor, etc.) and instruct the GPU 730 to generate images showing application progress for display on the display 750.

Based on execution of the application on processor 720, the processor may issue instructions for the GPU 730 to generate images using 3D data stored in memory 740. The GPU 730 includes specialized hardware for accelerating the generation of images in real time. For example, the GPU 730 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 720, which may have multiple cores with lots of cache memory that can handle a few software threads at a time, the GPU 730 may include hundreds or thousands of processing cores or "streaming multiprocessors" (SMs) 732 running in parallel.

In one example embodiment, the GPU 730 includes a plurality of programmable high performance processors that can be referred to as "streaming multiprocessors" ("SMs") 732, and a hardware-based graphics pipeline including a graphics primitive engine 734 and a raster engine 736. These components of the GPU 730 are configured to perform real-time image rendering using a technique called "scan conversion rasterization" to display three-dimensional scenes on a two-dimensional display 750. In rasterization, geometric building blocks (e.g., points, lines, triangles, quads, meshes, etc.) of a 3D scene are mapped to pixels of the display (often via a frame buffer memory).

The GPU 730 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 750 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 750.

To enable the GPU 730 to perform ray tracing in real time in an efficient manner, the GPU provides one or more "TTUs" 738 coupled to one or more SMs 732. The TTU 738 includes hardware components configured to perform (or accelerate) operations commonly utilized in ray tracing algorithms. A goal of the TTU 738 is to accelerate operations used in ray tracing to such an extent that it brings the power of ray tracing to real-time graphics application (e.g., games), enabling high-quality shadows, reflections, and global illumination. Results produced by the TTU 738 may be used together with or as an alternative to other graphics related operations performed in the GPU 730.

More specifically, SMs 732 and the TTU 738 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 732 working with TTU 738 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 738 is capable of accelerating in hardware certain of the more computationally-intensive aspects of that process.

Given a BVH constructed as described above, the TTU 738 performs a tree search where each node in the tree visited by the ray has a bounding volume for each descendent branch or leaf, and the ray only visits the descendent branches or leaves whose corresponding bound volume it intersects. In this way, TTU 738 explicitly tests only a small number of primitives for intersection, namely those that reside in leaf nodes intersected by the ray. In the example non-limiting embodiments, the TTU 738 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 738 does all of this in MIMD fashion, meaning that rays are handled independently once inside the TTU.

In the example non-limiting embodiments, the TTU 738 operates as a servant (coprocessor) to the SMs (streaming multiprocessors) 732. In other words, the TTU 738 in example non-limiting embodiments does not operate independently, but instead follows the commands of the SMs 732 to perform certain computationally-intensive ray tracing related tasks much more efficiently than the SMs 732 could perform themselves. In other embodiments or architectures, the TTU 138 could have more or less autonomy.

In the examples shown, the TTU 738 receives commands via SM 732 instructions and writes results back to an SM register file. For many use cases (e.g., opaque triangles with at most two level of instancing), the TTU 738 can service the ray tracing query without further interaction with the SM 732. More complicated queries (e.g., involving alpha-tested triangles, primitives other than triangles, or more than two levels of instancing) may require multiple round trips (although the technology herein reduces the need for such "round trips" for certain kinds of geometry by providing the TTU 738 with enhanced capabilities to autonomously perform ray-bounding-volume intersection testing without the need to ask the calling SM for help). In addition to tracing rays, the TTU 738 is capable of performing more general spatial queries where an AABB or the extruded volume between two AABBs (which we call a "beam") takes the place of the ray. Thus, while the TTU 738 is especially adapted to accelerate ray tracing related tasks, it can also be used to perform tasks other than ray tracing.

The TTU 738 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 738 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 8:
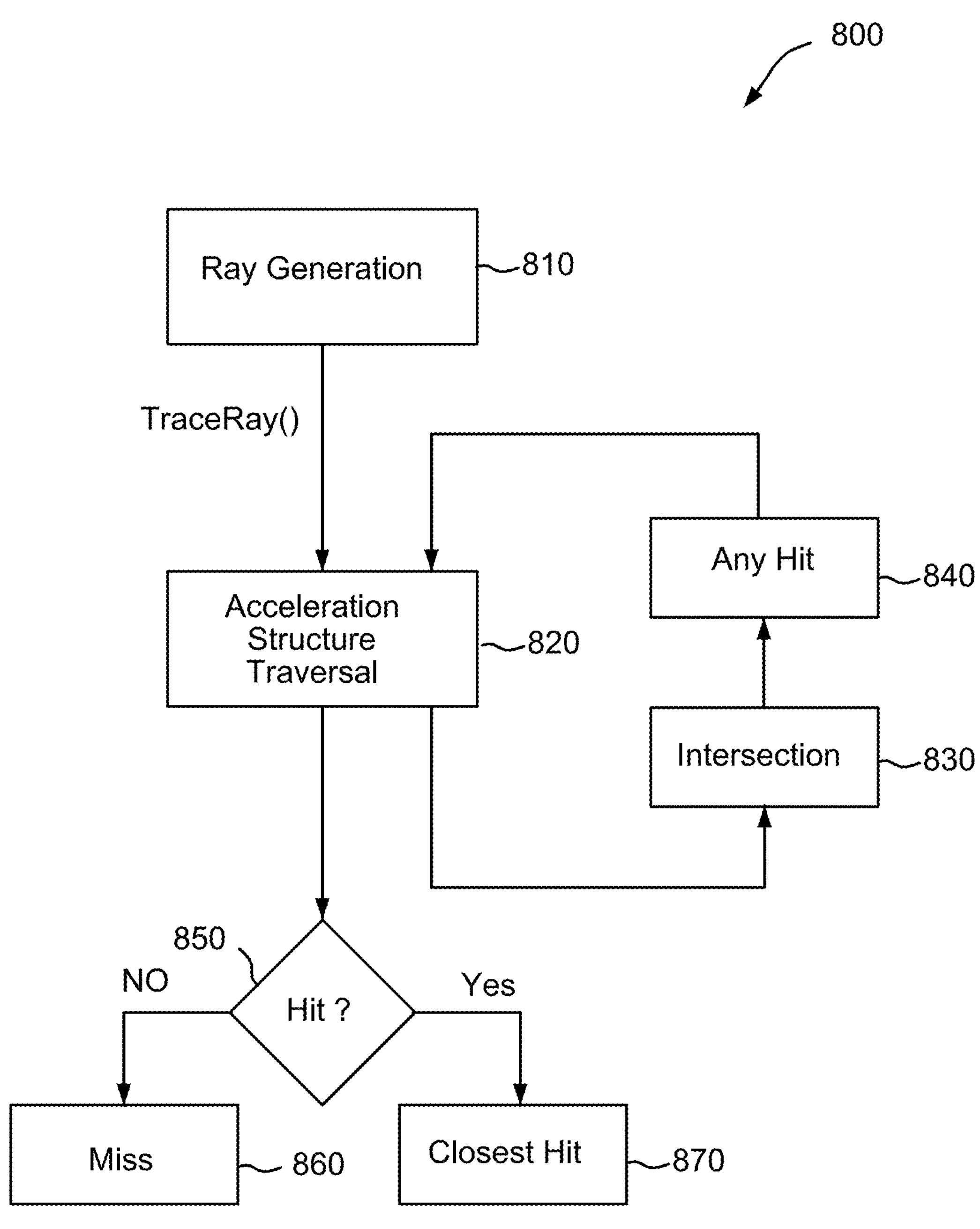
FIG. 8 is a flowchart of an example non-limiting ray tracing graphics pipeline according to some embodiments.

FIG. 8 shows an exemplary ray tracing shading pipeline 800 that may be performed by SM 732 and accelerated by TTU 738. The ray tracing shading pipeline 800 starts by an SM 732 invoking ray generation 810 and issuing a corresponding ray tracing request to the TTU 738. The ray tracing request identifies a single ray cast into the scene and asks the TTU 738 to search for intersections with an acceleration data structure the SM 732 also specifies. The TTU 738 traverses (FIG. 8 block 820) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 738 ray-primitive test block 1020 performs an intersection 830 process to determine whether the ray intersects the primitives. The TTU 738 returns intersection information to the SM 732, which may perform an “any hit” shading operation 840 in response to the intersection determination. For example, the SM 732 may perform (or have other hardware perform) a texture lookup for an intersected primitive and decide based on the appropriate texel’s value how to shade a pixel visualizing the ray. The SM 732 keeps track of such results since the TTU 738 may return multiple intersections with different geometry in the scene in arbitrary order.

Figure 9:
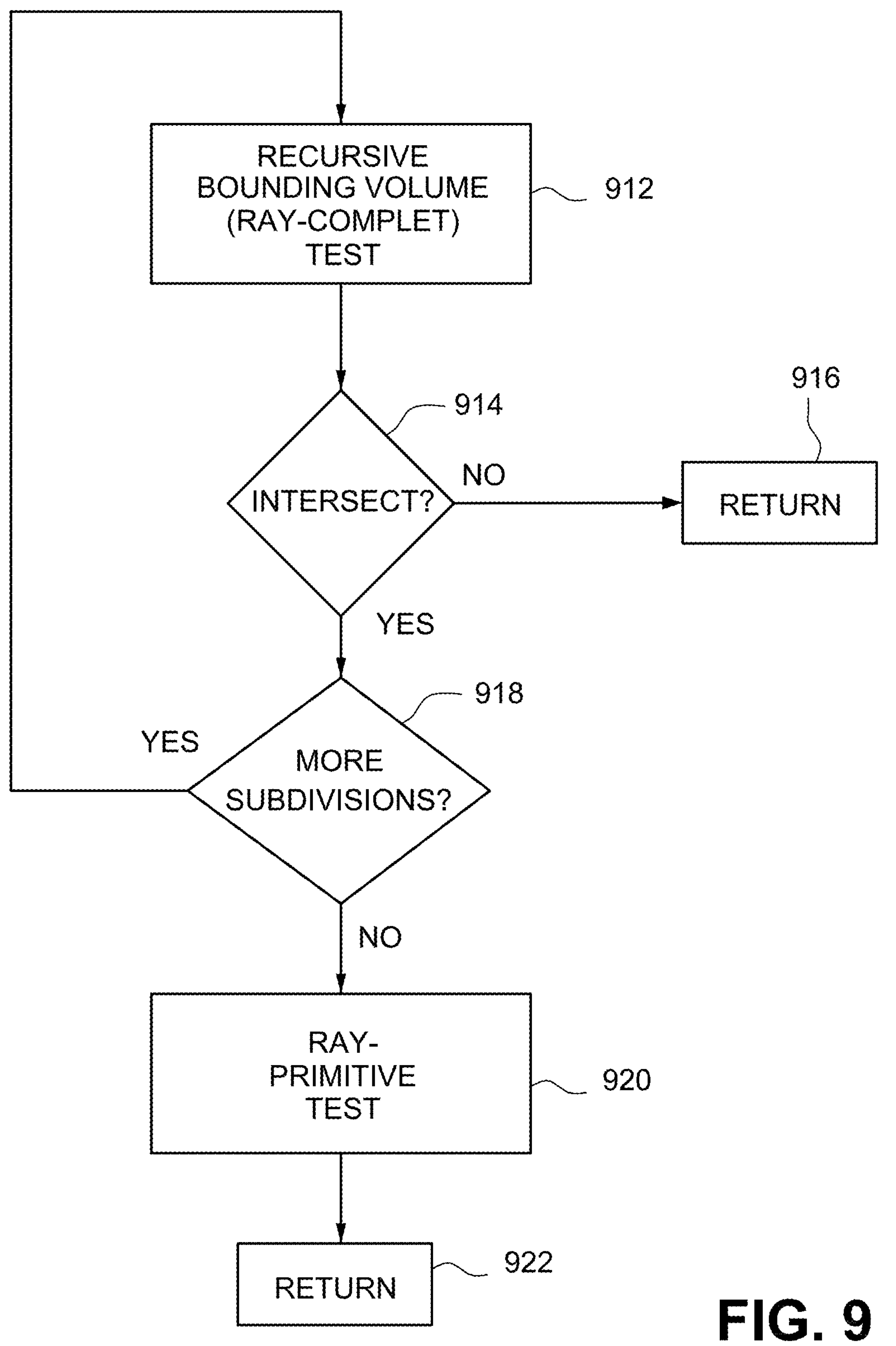
FIG. 9 is a flowchart of example non-limiting hardware based ray tracing operations, according to some embodiments.

FIG. 9 is a flowchart summarizing example ray tracing operations the TTU 738 performs as described above in cooperation with SM(s) 732. The FIG. 9 operations are performed by TTU 738 in cooperation with its interaction with an SM 732. The TTU 738 may thus receive the identification of a ray from the SM 732 and traversal state enumerating one or more nodes in one or more BVH’s that the ray must traverse. The TTU 738 determines which bounding volumes of a BVH data structure the ray intersects (the “ray-complet” test 912). The TTU 738 can also subsequently determine whether the ray intersects one or more primitives in the intersected bounding volumes and which triangles are intersected (the “ray-primitive test” 920)—or the SM 732 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

Figure 1A:
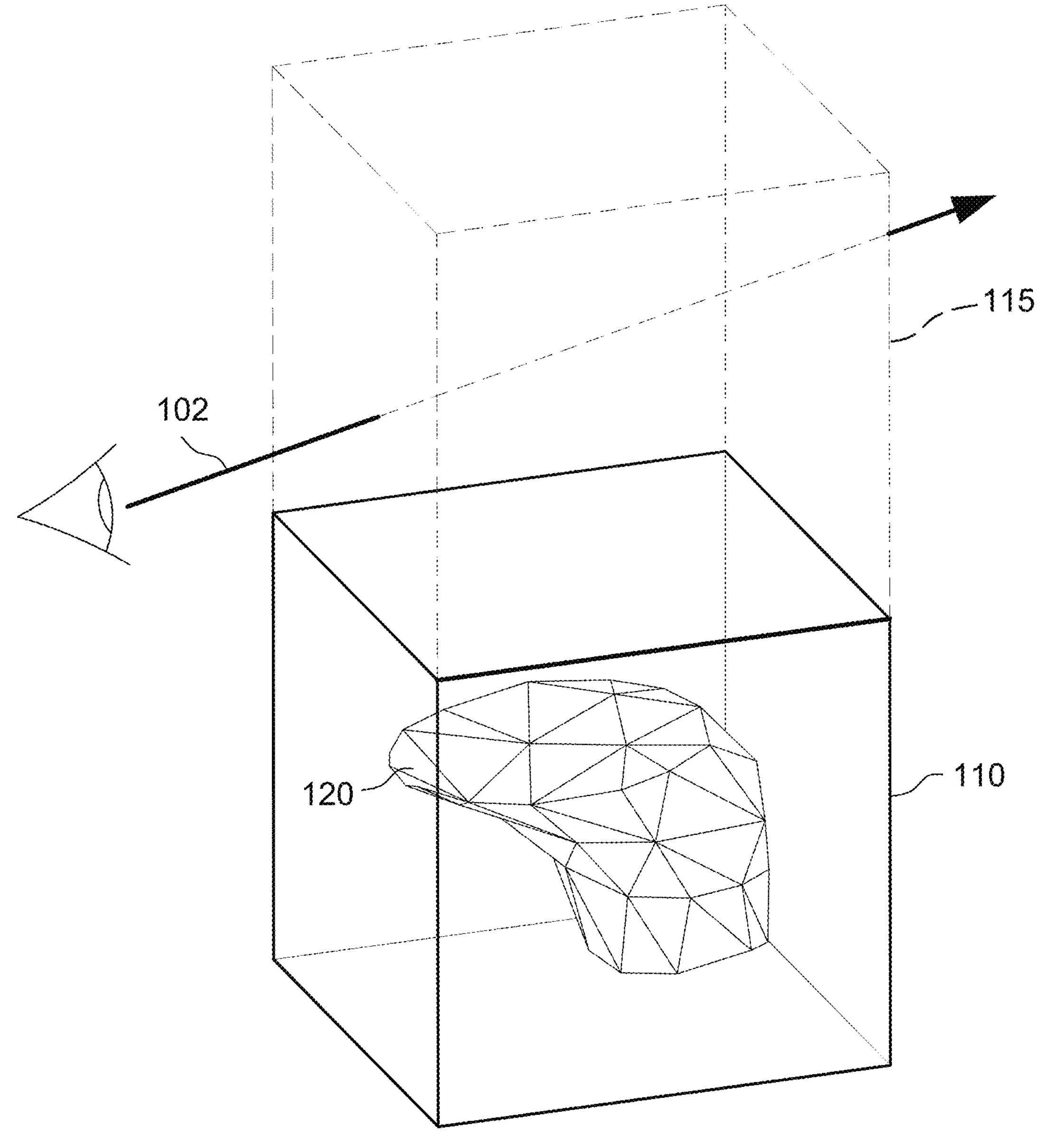
FIGS. 1A-1C show example simplified ray tracing tests to determine whether the ray passes through a bounding volume containing geometry and whether the ray intersects geometry within the bounding volume.
Figures 1B, 1C:
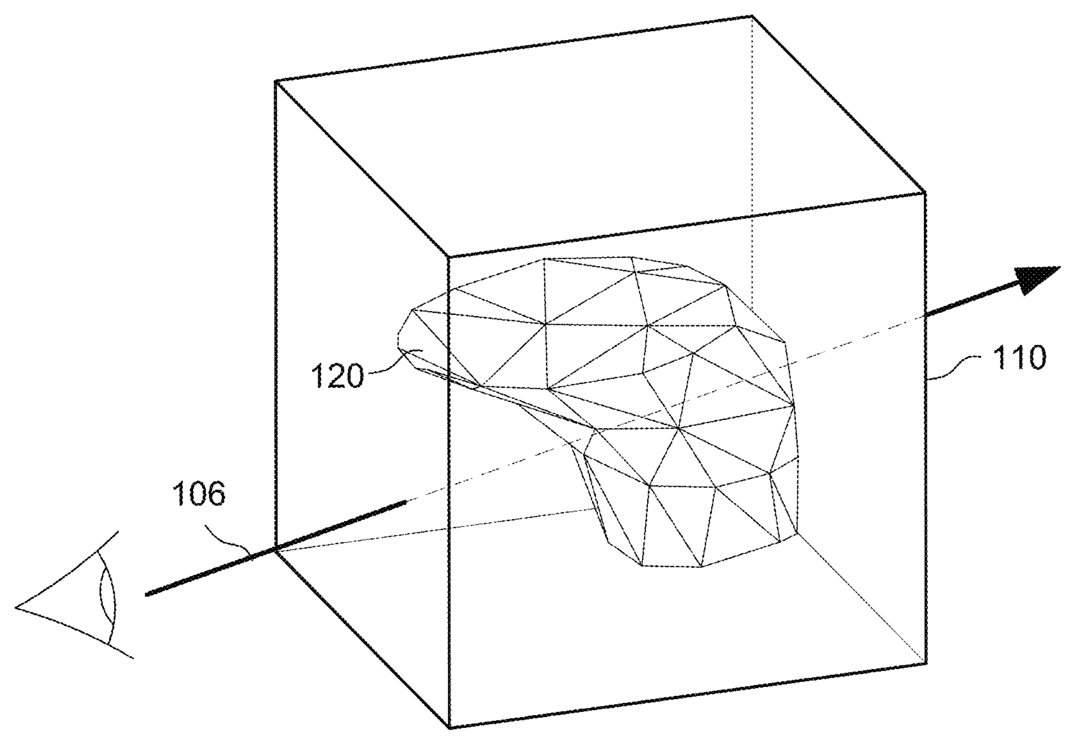

First, the TTU 738 inspects the traversal state of the ray. If a stack the TTU 738 maintains for the ray is empty, then traversal is complete. If there is an entry on the top of the stack, the traversal co-processor 738 issues a request to the memory subsystem to retrieve that node. The traversal co-processor 738 then performs a bounding box test 912 to determine if a bounding volume of a BVH data structure is intersected by a particular ray the SM 732 specifies (step 912, 914). If the bounding box test determines that the bounding volume is not intersected by the ray (“No” in step 914), then there is no need to perform any further testing for visualization and the TTU 738 can return this result to the requesting SM 732. This is because if a ray misses a bounding volume (as in FIG. 1A with respect to bounding volume 110), then the ray will miss all other smaller bounding volumes inside the bounding volume being tested and any primitives that bounding volume contains.

If the bounding box test performed by the TTU 738 reveals that the bounding volume is intersected by the ray (“Yes” in Step 914), then the TTU determines if the bounding volume can be subdivided into smaller bounding volumes (step 918). In one example embodiment, the TTU 738 isn’t necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 738, it is testing itself against the bounding volumes of the node’s children. The ray only pushes stack entries onto its stack for those branches or leaves whose representative bounding volumes were hit. When a ray fetches a node in the example embodiment, it doesn’t test against the bounding volume of the node—it tests against the bounding volumes of the node’s children. The TTU 738 pushes nodes whose bounding volumes are hit by a ray onto the ray’s traversal stack (e.g. traversal stack 1302 in FIG. 13) in an order determined by ray configuration. For example, it is possible to push nodes onto the traversal stack in the order the nodes appear in memory, or in the order that they appear along the length of the ray, or in some other order. If there are further subdivisions of the bounding volume (“Yes” in step 918), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 914 while other bounding volumes may result in still further and further subdivisions being tested for intersection by TTU 738 recursively applying steps 912-918.

Once the TTU 738 determines that the bounding volumes intersected by the ray are leaf nodes (“No” in step 918), the TTU 738 and/or SM 732 performs a primitive (e.g., triangle) intersection test 920 to determine whether the ray intersects primitives in the intersected bounding volumes and which primitives the ray intersects. The TTU 738 thus performs a depth-first traversal of intersected descendent branch nodes until leaf nodes are reached. The TTU 738 processes the leaf nodes. If the leaf nodes are primitive ranges, the TTU 738 or the SM 732 tests them against the ray. If the leaf nodes are instance nodes, the TTU 738 or the SM 732 applies the instance transform. If the leaf nodes are item ranges, the TTU 738 returns them to the requesting SM 732. In the example non-limiting embodiments, the SM 732 can command the TTU 738 to perform different kinds of ray-primitive intersection tests and report different results depending on the operations coming from an application (or an software stack the application is running on) and relayed by the SM to the TTU. For example, the SM 732 can command the TTU 738 to report the nearest visible primitive revealed by the intersection test, or to report all primitives the ray intersects irrespective of whether they are the nearest visible primitive. The SM 732 can use these different results for different kinds of visualization. Or the SM 732 can perform the ray-primitive intersection test itself once the TTU 738 has reported the ray-complet test results. Once the TTU 738 is done processing the leaf nodes, there may be other branch nodes (pushed earlier onto the ray’s stack) to test.

Example Non-Limiting TTU 738 Hardware Implementation

Figure 10:
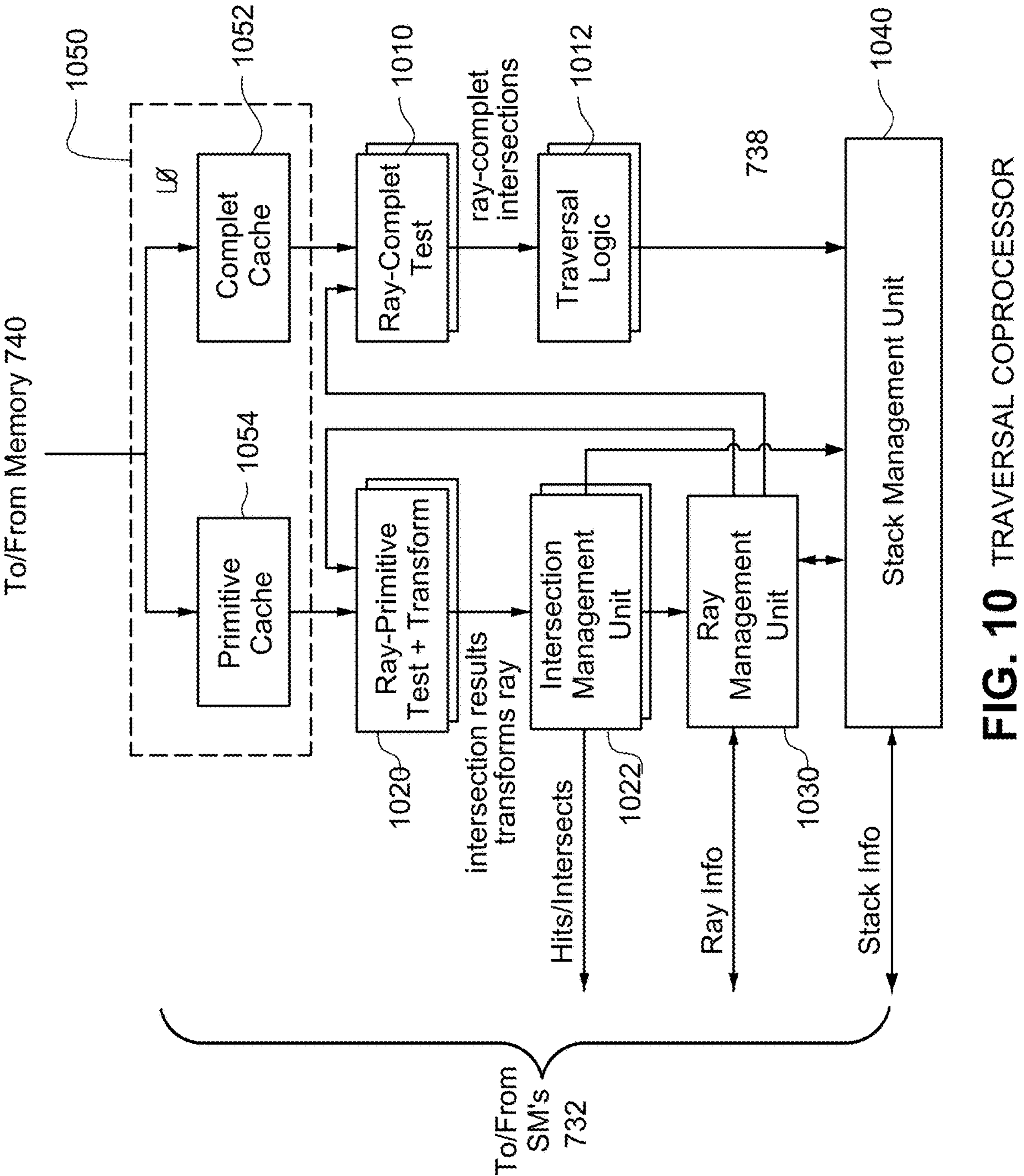
FIG. 10 shows a simplified example non-limiting traversal co-processor comprising a tree traversal unit (TTU), according to some embodiments.

FIG. 10 shows an example simplified block diagram of TTU 738 including hardware configured to perform accelerated traversal operations as described above. In some embodiments, the TTU 738 may perform a depth-first traversal of a bounding volume hierarchy using a short stack traversal with intersection testing of supported leaf node primitives and mid-traversal return of alpha primitives and unsupported leaf node primitives (items). The TTU 738 includes dedicated hardware to determine whether a ray intersects bounding volumes and dedicated hardware to determine whether a ray intersects primitives of the tree data structure.

In more detail, TTU 738 includes an intersection management block 1022, a ray management block 1030 and a stack management block 1040. Each of these blocks (and all of the other blocks in FIG. 10) may constitute dedicated hardware implemented by logic gates, registers, hardware-embedded lookup tables or other combinatorial logic, etc.

The ray management block 1030 is responsible for managing information about and performing operations concerning a ray specified by an SM 732 to the ray management block. The stack management block 1040 works in conjunction with traversal logic 1012 to manage information about and perform operations related to traversal of a BVH acceleration data structure. Traversal logic 1012 is directed by results of a ray-complet test block 1010 that tests intersections between the ray indicated by the ray management block 1030 and volumetric subdivisions represented by the BVH, using instance transforms as needed. The ray-complet test block 1010 retrieves additional information concerning the BVH from memory 740 via an L0 complet cache 1052 that is part of the TTU 738. The results of the ray-complet test block 1010 informs the traversal logic 1012 as to whether further recursive traversals are needed. The stack management block 740 maintains stacks to keep track of state information as the traversal logic 1012 traverses from one level of the BVH to another, with the stack management block 1040 pushing items onto the stack as the traversal logic traverses deeper into the BVH and popping items from the stack as the traversal logic traverses upwards in the BVH. The stack management block 1040 is able to provide state information (e.g., intermediate or final results) to the requesting SM 732 at any time the SM requests.

The intersection management block 1022 manages information about and performs operations concerning intersections between rays and primitives, using instance transforms as needed. The ray-primitive test block 1020 retrieves information concerning geometry from memory 140 on an as-needed basis via an L0 primitive cache 1054 that is part of TTU 138. The intersection management block 1022 is informed by results of intersection tests the ray-primitive test and transform block 1020 performs. Thus, the ray-primitive test and transform block 1-20 provides intersection results to the intersection management block 1022, which reports geometry hits and intersections to the requesting SM 732.

A Stack Management Unit 1040 inspects the traversal state to determine what type of data needs to be retrieved and which data path (complet or primitive) will consume it. The intersections for the bounding volumes are determined in the ray-complet test path of the TTU 738 including one or more ray-complet test blocks 1010 and one or more traversal logic blocks 1012. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 738 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 1020 and one or more intersection management blocks 1022.

The TTU 738 receives queries from one or more SMs 732 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 1030. The stored ray information (e.g., ray length) may be updated based on the results of the ray-primitive test.

The TTU 738 may request the BVH data structure identified in the query to be retrieved from memory outside of the TTU 738. Retrieved portions of the BVH data structure may be cached in the level-zero (L0) cache 1050 within the TTU 738 so the information is available for other time-coherent TTU operations, thereby reducing memory 1040 accesses. Portions of the BVH data structure needed for the ray-complet test may be stored in a L0 complet cache 1052 and portions of the BVH data structure needed for the ray-primitive test may be stored in an L0 primitive cache 1054.

After the complet information needed for a requested traversal step is available in the complet cache 1052, the ray-complet test block 1010 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 738 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 1012 to traverse down to the next level of the BVH). These steps are repeated recursively until intersected leaf nodes of the BVH are encountered The ray-complet test block 1010 may provide ray-complet intersections to the traversal logic 1012. Using the results of the ray-complet test, the traversal logic 1012 creates stack entries to be pushed to the stack management block 1040. The stack entries may indicate internal nodes (i.e., a node that includes one or more child nodes) that need to be further tested for ray intersections by the ray-complet test block 1010 and/or triangles identified in an intersected leaf node that need to be tested for ray intersections by the ray-primitive test and transform block 1020. The ray-complet test block 1010 may repeat the traversal on internal nodes identified in the stack to determine all leaf nodes in the BVH that the ray intersects. The precise tests the ray-complet test block 1010 performs will in the example non-limiting embodiment be determined by mode bits, ray operations (see below) and culling of hits, and the TTU 738 may return intermediate as well as final results to the SM 732.

Ray-Primitive Intersection Testing

Figure 11:
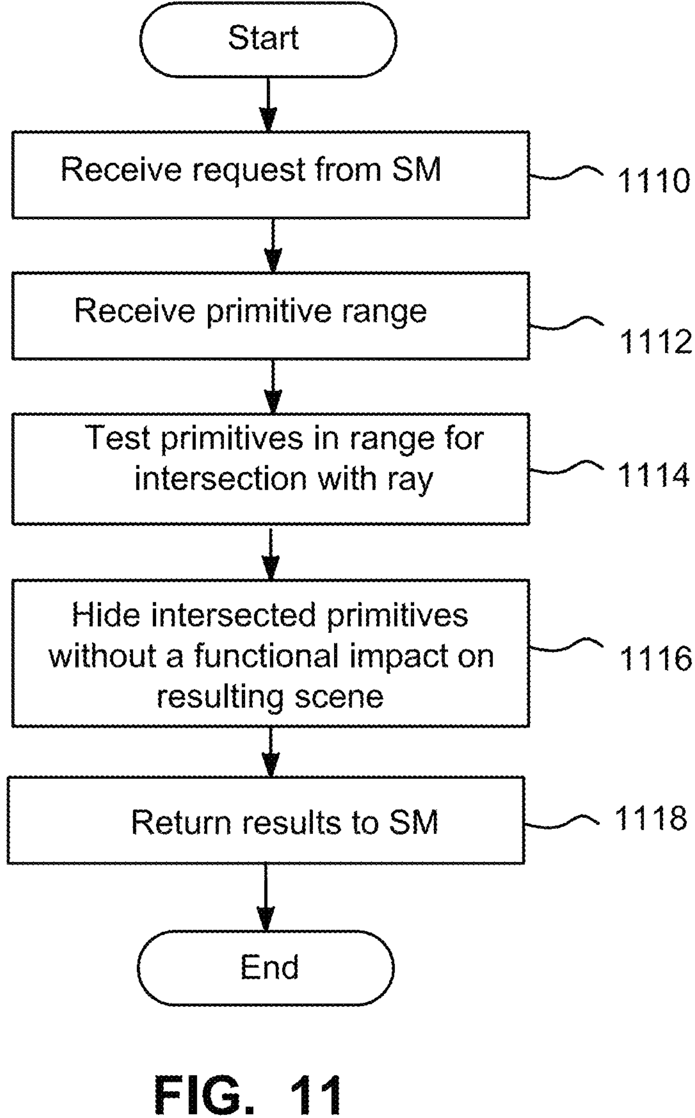
FIG. 11 is a flowcharts of example TTU processing, according to some embodiments.

Referring again to FIG. 11, the TTU 738 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 738 in some embodiments may not be able to help with the ray-primitive intersection testing. In such cases, the TTU 738 simply reports the ray-complet intersection test results to the SM 732, and the SM 732 performs the ray-primitive intersection test itself. In other cases (e.g., triangles), the TTU 732 can perform the ray-triangle intersection test itself, thereby further increasing performance of the overall ray tracing process. For sake of completeness, the following describes how the TTU 738 can perform or accelerate the ray-primitive intersection testing.

As explained above, leaf nodes found to be intersected by the ray identify (enclose) primitives that may or may not be intersected by the ray. One option is for the TTU 738 to provide e.g., a range of geometry identified in the intersected leaf nodes to the SM 732 for further processing. For example, the SM 732 may itself determine whether the identified primitives are intersected by the ray based on the information the TTU 738 provides as a result of the TTU traversing the BVH. To offload this processing from the SM 732 and thereby accelerate it using the hardware of the TTU 738, the stack management block 1040 may issue requests for the ray-primitive and transform block 1020 to perform a ray-primitive test for the primitives within intersected leaf nodes the TTU's ray-complet test block 1010 identified. In some embodiments, the SM 732 may issue a request for the ray-primitive test to test a specific range of primitives and transform block 1020 irrespective of how that geometry range was identified.

After making sure the primitive data needed for a requested ray-primitive test is available in the primitive cache 1054, the ray-primitive and transform block 1020 may determine primitives that are intersected by the ray using the ray information stored in the ray management block 1030. The ray-primitive test block 1020 provides the identification of primitives determined to be intersected by the ray to the intersection management block 1022.

The intersection management block 1022 can return the results of the ray-primitive test to the SM 732. The results of the ray-primitive test may include identifiers of intersected primitives, the distance of intersections from the ray origin and other information concerning properties of the intersected primitives. In some embodiments, the intersection management block 1022 may modify an existing ray-primitive test (e.g., by modifying the length of the ray) based on previous intersection results from the ray-primitive and transform block 1020.

Figure 14:
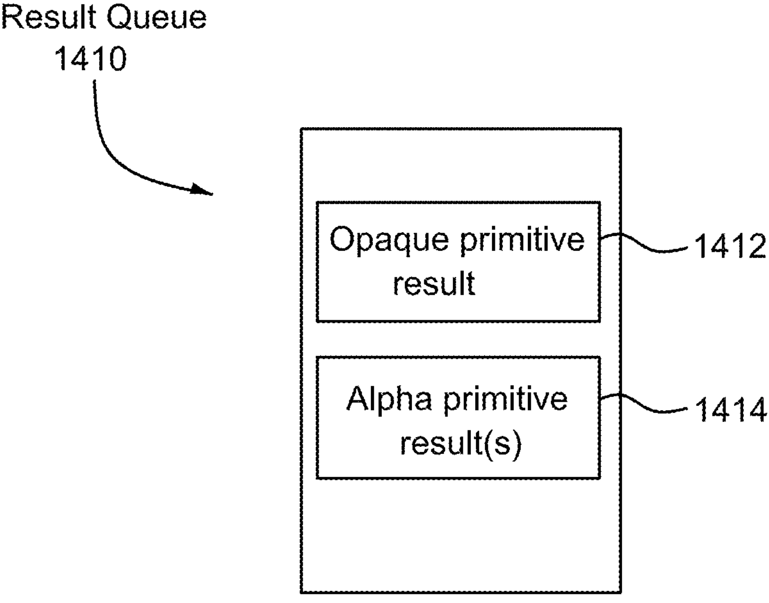
FIG. 14 shows an example results queue for use by the ray tracing pipeline according to some embodiments.

The intersection management block 1022 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 732 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 738 can push transparent hits to queues in memory for later handling by the SM 732 and directly handle trimmed triangles by sending requests to the texture unit. Each triangle may include a designator to indicate the triangle type. The intersection management block 1022 is configured to maintain a result queue for tracking the different types of intersected triangles. For example, the result queue (e.g. result queue 1410 in FIG. 14) may store one or more intersected opaque triangle identifiers in one queue 1412 and one or more transparent triangle identifiers in another queue 1414.

For opaque triangles, the ray intersection for less complex geometry can be fully determined in the TTU 738 because the area of the opaque triangle blocks the ray from going past the surface of the triangle. For transparent triangles, ray intersections cannot in some embodiments be fully determined in the TTU 738 because TTU 738 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 1020 determines are intersected may be sent to the SM 732, for the SM to make the full determination as to whether the triangle affects visibility along the ray.

The SM 732 can resolve whether or not the ray intersects a texture associated with the transparent triangle and/or whether the ray will be blocked by the texture. The SM 732 may in some cases send a modified query to the TTU 738 (e.g., shortening the ray if the ray is blocked by the texture) based on this determination. In one embodiment, the TTU 738 may be configured to return all triangles determined to intersect the ray to the SM 732 for further processing. Because returning every triangle intersection to the SM 732 for further processing is costly in terms of interface and thread synchronization, the TTU 738 may be configured to hide triangles which are intersected but are provably capable of being hidden without a functional impact on the resulting scene. For example, because the TTU 738 is provided with triangle type information (e.g., whether a triangle is opaque or transparent), the TTU 738 may use the triangle type information to determine intersected triangles that are occluded along the ray by another intersecting opaque triangle and which thus need not be included in the results because they will not affect the visibility along the ray. If the TTU 738 knows that a triangle is occluded along the ray by an opaque triangle, the occluded triangle can be hidden from the results without impact on visualization of the resulting scene.

The intersection management block 1022 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 732.

In some embodiments, once an opaque triangle intersection is identified, the intersection management block 1022 may shorten the ray stored in the ray management block 1030 so that bounding volumes (which may include triangles) behind the intersected opaque triangle (along the ray) will not be identified as intersecting the ray.

The intersection management block 1022 may store information about intersected transparent triangles in a separate queue. The stored information about intersected transparent triangles may be sent to the SM 732 for the SM to resolve whether or not the ray intersects a texture associated with the triangle and/or whether the texture blocks the ray. The SM may return the results of this determination to the TTU 738 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 738 may determine which triangles in the acceleration data structure are intersected by the ray and return the results to the SM 732. However, returning to the SM 732 a result on every triangle intersection is costly in terms of interface and thread synchronization. The TTU 738 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 738 disclosed in this application provides for some of the intersections to be discarded within the TTU 738 without SM 732 intervention so that less intersections are returned to the SM 732 and the SM 132 does not have to inspect all intersected triangles or item ranges.

Example Instancing Pipeline Implementation by TTU 738 and SM 732

The following describes how TTU 738 in example embodiments performs instancing and associated transforms.

The FIG. 12A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 12A is essentially software-defined (which in example embodiments means it is determined by the SMs 732) but makes extensive use of hardware acceleration by TTU 738. Key components include the SM 732 (and the rest of the compute pipeline), the TTU 738 (which serves as a coprocessor to SM), and the L1 cache and downstream memory system, from which the TTU fetches BVH and triangle data.

The pipeline shown in FIG. 12A shows that bounding volume hierarchy creation 1202 can be performed ahead of time by a development system. It also shows that ray creation and distribution 1204 are performed or controlled by the SM 732 or other software in the example embodiment, as shading (which can include lighting and texturing). The example pipeline includes a "top level" BVH tree traversal 1206, ray transformation 1214, "bottom level" BVH tree traversal 1218, and a ray/triangle (or other primitive) intersection 1226 that are each performed by the TTU 738. These do not have to be performed in the order shown, as handshaking between the TTU 738 and the SM 732 determines what the TTU 738 does and in what order.

The SM 732 presents one or more rays to the TTU 738 at a time. Each ray the SM 732 presents to the TTU 738 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 732 to communicate certain state information to the TTU 738 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 732 presents with each query (e.g., ray) may at least partly control how the TTU 738 will process the query when the query intersects the bounding volume of a specific type or intersects a primitive of a specific primitive type. The mode flags the SM 732 provides to the TTU 738 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 738 to control various aspects of traversal behavior, back-face culling, and handling of the various child node types, subject to a pass/fail status of an optional RayOp test. RayOp tests add flexibility to the capabilities of the TTU 738, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 12A, the TTU 738 performs a top level tree traversal 1206 and a bottom level tree traversal 1218. In the example embodiment, the two level traversal of the BVH enables fast ray tracing responses to dynamic scene changes.

In some embodiments, upon entry to top level tree traversal, or in the top level tree traversal, an instance node 1205 specifying a top level transform is encountered in the BVH. The instance node 1205 indicates to the TTU that the subtree rooted at the instance node 1205 is aligned to an alternate world space coordinate system for which the transform from the world space is defined in the instance node 1205.

In response to traversing instance node 1205, TTU transforms the ray (or rays) received from the SM from world space to the alternate world space.

In some embodiments, for each ray, the transformed ray's information is written to the top level ray slot, thereby overwriting the information initially stored there for the ray in the world space. For example, the origin and direction for the transformed ray is written to the top level ray slot, thereby overwriting the origin and direction in for the ray in world space. The overwriting of the top ray slot unconditionally transforms the ray to the transformed world space. This unconditional transforming of the ray enables the TTU to provide two levels of transformation without any hardware state in addition to that used for traversal with only one level (e.g. to object space) of transform.

The top level of the acceleration structure (TLAS) contains geometry in world space coordinates and the bottom level of the acceleration structure (BLAS) contains geometry in object space coordinates. The TTU maintains ray state and stack state separately for the TLAS traversal and the BLAS traversal because they are effectively independent traversals.

Figures 15, 16:
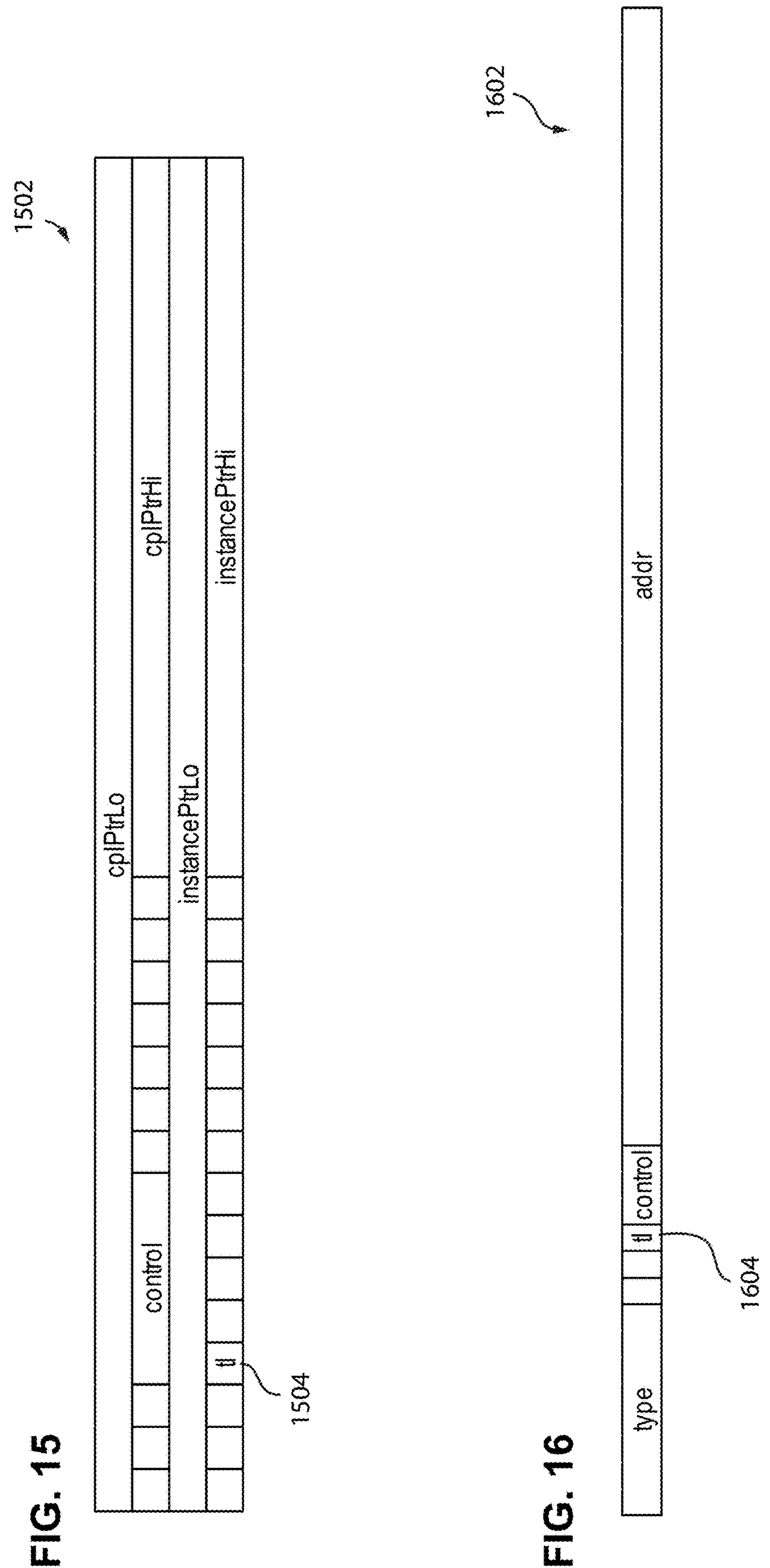
FIG. 15 shows some information transmitted from a streaming multiprocessor to the traversal coprocessor, according to some embodiments.
FIG. 16 shows an example stack entry used by the traversal coprocessor, according to some embodiments.

As described above the SM informs the TTU the location in the BVH for starting a ray traversal upon launching a new ray query or relaunching a ray query by including a stack initialization complet in the ray query transmitted to the TTU. The stack initialization complet includes a pointer to the root of the subtree that is to be traversed. In some embodiments, a top-level transform is indicated by a top level flag ("tl flag") 1502 in the stack initialization complet is rooted in a top level transform. FIG. 15 shows an example stack initialization complet 1502 format with a top level flag 1504, a pointer ("instance pointer") to an instance node 1506, and a pointer ("complet pointer") to a complet 1508. In some embodiments, the top level flag is a single bit.

When a new ray query is launched, the top level flag is set by the SM to indicate that the instance pointer in the stack initialization complet is for a top-level transform. In some embodiments, for the top level flag to be set, both the complet pointer and the instance pointer must be non-zero. When that is the case and the top level flag is set, then two entries are pushed on the top stack: a first instance node stack entry based on the non-zero instance pointer with a top level flag set and then a complet stack entry based on the non-zero complet pointer. If the instance pointer is zero, then the top level flag is ignored and a stack may be crafted based on the contents of the complet. If the complet pointer is zero, but the instance pointer is non-zero with the top level flag set, then an empty stack may be created. In the case of new ray queries, it is up to the SM to properly set the top level flag and include the pointer to the top-level transform instance.

An example stack entry format 1602 is shown in FIG. 16. A top level flag, which as shown in FIG. 16 may be a single bit, in the stack entry type, as seen in FIG. 16 indicates to the TTU that the corresponding node in the acceleration structure is an instance node for a top level transform. A top-level transform is indicated by the top level flag 1604 being set in the stack entry. A stack entry having the top level flag set is referred to herein as a top level instance stack entry. In example embodiments, the TTU itself may never set the top level flag in a stack entry. When the top level flag is set in the stack entry, certain other flags in the stack entry, such as, for example, flags "b" for bottom ray transformed, "s" for return to SM, and "i" for initialized bits may be defined as reserved and should be set to 0. In the case of a new ray query being launched the TTU creates a first instance stack entry with the top level flag set, based on the stack initialization complet received from the SM. In the case of stack restores, however, it is up to the SM to craft a first instance node stack entry that conforms to the above description.

A stack entry with top level flag set can be processed in a manner similar to processing a stack entry without the top level flag being set, with the following changes: the intersection management unit 1022 does not record the instance ID nor the address of the instance node; the instance management unit 1022 does not record the bottom BVH root complet address since that will not be sent to stack management unit 1040; the ray management unit 1030 writes the transformed ray origin and direction into the top ray slot; only the ray origin and direction are written, with ray flag and timestamp bits remain unmodified; the intersection management unit 1022 will send a pop notification to SMU and the top-level transform instance node stack entry will be popped; and the bottom stack is not affected and stack management unit 1040 will continue traversal on the top-stack.

A top-level transform may use the same instance node format as for other instance nodes, but fields other than the transform matrix values may be ignored in the top level transforms. After a top-level transform, the ray stored in the top slot is overwritten and cannot be recovered within the TTU. That is, a top-level transform unlike a typical transform is destructive. It is up to the SM side to track the original ray.

Unlike other instance transforms such as transforms from world space to object space, top-level transforms do not count towards forward progress in the case of preemption even though the entry is popped from the stack. Since the top-level transform is popped immediately and does not count for forward progress, it is not returned to the SM.

Top-level transforms may be used for both an initial launch (e.g. new ray query) and a re-launch using stack restore. For stack restore, the stack may be modified on the SM to put the top-level transform on the top of the top stack. For an initial launch, the stack initialization complet with the top level flag set can be used to create the correct stack.

In some embodiments, the following restrictions may hold for top-level transform use and any violation may be considered undefined behavior: top-level transforms can only be used on the top stack; any top-level transform must be the first entry on the stack when launched (i.e., top-level transforms cannot be chained together and top-level transforms cannot follow a regular transform); a maximum stack limit should be configured to account (e.g. leave space on the stack) for crafted stack restores to add a top-level transform.

The stack management unit (SMU) 1040 is configured to, on receiving a stack initialization complet with the top level flag set and both pointers (instance pointer and complet pointer) being non-zero, craft a top stack with two entries: a first instance node stack entry based on the non-zero instance pointer with the top level flag set and then a complet stack entry based on the non-zero complet pointer. If either pointer is zero, SMU will craft a stack as described above.

The SMU 1040 will pass through the top level flag from the first instance node stack entry as metadata to the RTT/IMU 1022.

After a top-level transform, SMU 1040, as directed by IMU 1022, will pop the first instance node stack entry from the top stack and continue traversal on the top stack. The bottom stack will not be activated at that time. SMU 1040 will not count the pop of the first instance node stack entry as forward progress with regards to timeout/preemption.

The intersection management unit (IMU) 1022, does not record the instance ID nor the address of the instance node for a top level transform. IMU 1022 does not record the bottom BVH root complet address since that will not be sent to SMU. IMU will send the transform result to RMU 1030 as usual, but with a top-level flag set.

The IMU 1022 will send a pop notification to SMU 1040 and the top-level transform instance node stack entry will be popped.

The ray management unit (RMU) 1030, when the top-level flag is set for a transform result, will write the transformed ray into the top ray slot's ray origin and direction. Only the ray origin and direction are written. Ray flag and timestamp bits remain unchanged.

For top-level transform, the BVH builder constructs an alternate world space with modified BLAS transforms and a new top-level transform instance node. As described above, the SM creates queries that pass in the top-level transform on launch of new ray queries as well as on relaunch with stack restore.

Ray transformation 1214 provides the appropriate transition from the top level tree traversal 1206 to the bottom level tree traversal 1218 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1206 by TTU 738 receives complets from the L1 cache 1212, and provides an instance to the ray transformation 1214 for transformation, or a miss/end output 1213 to the SM 732 for closest hit shader 1215 processing by the SM (this block can also operate recursively based on non-leaf nodes/no hit conditions). In the top level tree traversal 1206, a next complet fetch step 1208 fetches the next complet to be tested for ray intersection in step 1210 from the memory and/or cache hierarchy and ray-bounding volume intersection testing is done on the bounding volumes in the fetched complet.

As described above, an instance node connects one BVH to another BVH which is in a different coordinate system. When a child of the intersected bounding volume is an instance node, the ray transformation 1214 is able to retrieve an appropriate transform matrix from the L1 cache 1216. The TTU 738, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 738 shown in FIG. 12B, the TTU does not execute a "bottom" level tree traversal 1018 and noninstanced tree BVH traversals are performed by blocks 1208, 1210 e.g., using only one stack. The TTU 738 can switch between the FIG. 12A instanced operations and the FIG. 12B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1210 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

Figure 13:
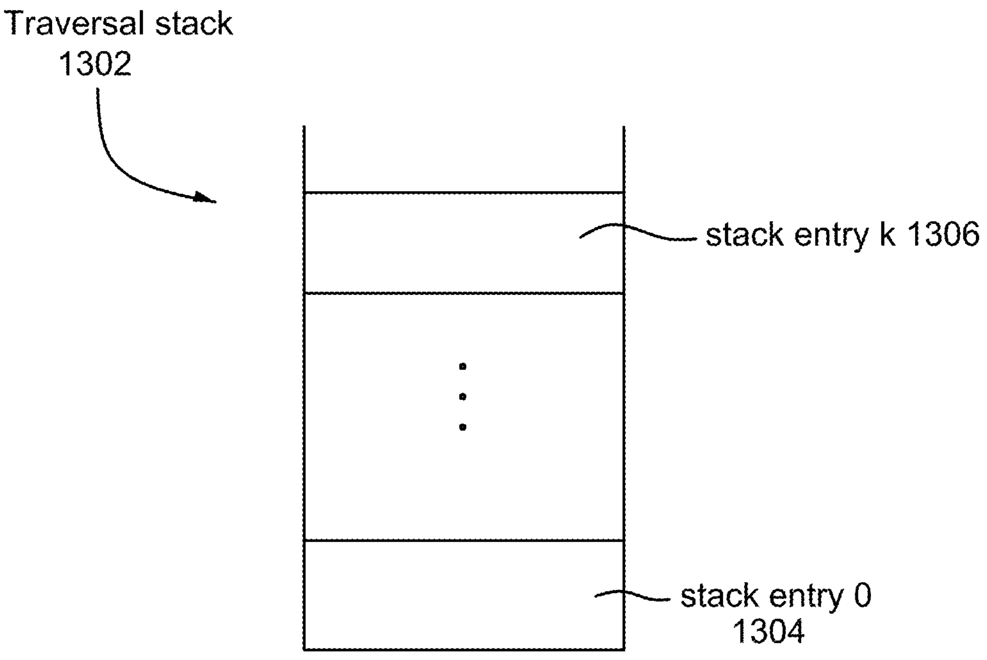
FIG. 13 shows an example traversal stack for use by the ray tracing pipeline, according to some embodiments.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1206, and primitives to be tested for intersection, and a larger local stack data structure can be used to keep track of the traversal state in the bottom level tree traversal 1218. FIG. 13 shows an example traversal stack 1302 with bottom stack entry 1304 and top stack entry 1306.

Example Bottom Level Tree Traversal

In the bottom level tree traversal 1218, a next complet fetch step 1222 fetches the next complet to be tested for ray intersection in step 1224 from the memory and/or cache hierarchy 1220 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1206 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1226.

The leaf outputs of the bottom level tree traversal 1218 are provided to the ray/triangle intersection 1226 (which has L0 cache access as well as ability to retrieve triangles via the L1 cache 1228). The L0 complet and triangle caches may be small read-only caches internal to the TTU 138. The ray/triangle intersection 1226 may also receive leaf outputs from the top level tree traversal 1206 when certain leaf nodes are reached without traversing an instanced BVH.

After all the primitives in the primitive range have been processed, the Intersection Management Unit inspects the state of the result Queue (e.g. result queue 1410 in FIG. 14) and crafts packets to send to the Stack Management Unit and/or Ray Management Unit to update the ray's attributes and traversal state, set up the ray's next traversal step, and/or return the ray to the SM 732 (if necessary). If the result queue contains opaque 1412 or alpha 1414 intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 1040 receives the packet from Intersection Management Unit 1022, the Stack Management Unit 1040 inspects the packet to determine the next action required to complete the traversal step and start the next one. If the packet from Intersection Management Unit 1022 indicates an opaque intersection has been found in the primitive range and the ray mode bits indicate the ray is to finish traversal once any intersection has been found the Stack Management Unit 1040 returns the ray and its results queue to the SM with traversal state indicating that traversal is complete (a done flag set and/or an empty top level and bottom level stack). If the packet from Intersection Management Unit 1022 indicates that there are opaque or alpha intersection in the result queue and that there are remaining alpha intersections in the primitive range not present in the result queue that were encountered by the ray during the processing of the primitive range that have not already been returned to the SM, the Stack Management Unit 1040 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 1022 indicates that no opaque or alpha intersections were found when the ray processed the primitive range the Stack Management Unit 1040 pops the top of stack entry (corresponding to the finished primitive range) off the active traversal stack. If the packet from Stack Management Unit 1040 indicates that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 1040 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 1040 sets the active stack to the top stack. If the top stack is the active stack, and the active stack is empty, then the Stack Management Unit 1040 returns the ray and its result queue to the SM with traversal state indicating that traversal is complete (a done flag set and/or an empty top level and bottom level stack). If the active stack contains one or more stack entries, then the Stack Management Unit 1040 inspects the top stack entry and starts the next traversal step. Testing of primitive and/or primitive ranges for intersections with a ray and returning results to the SM 732 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Acceleration of More than Two Levels of Transforms

Figure 17:
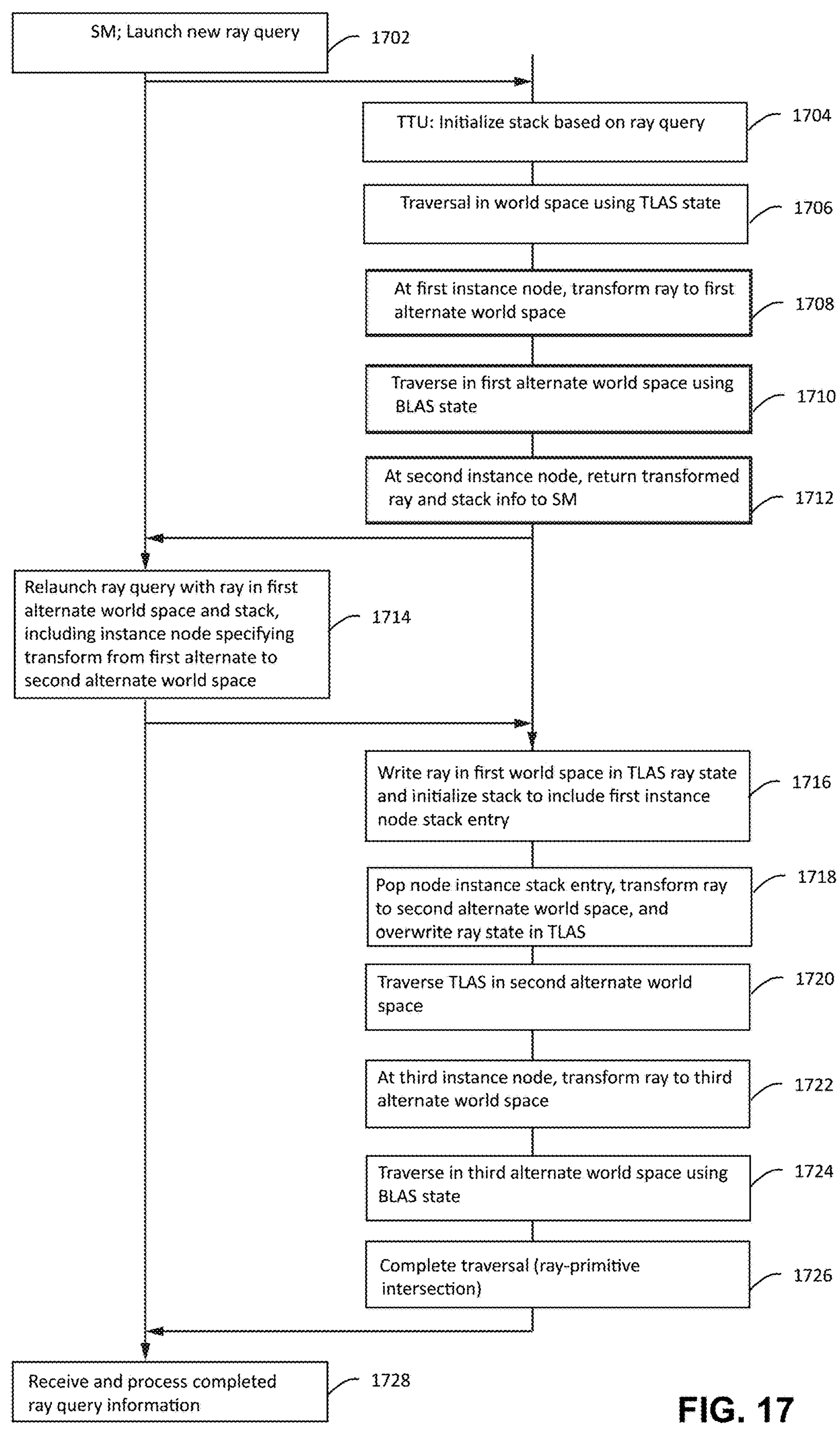
FIG. 17 shows an example of the SM and the TTU traversing a path of more than 2 transforms, according to some embodiments.

The above description of FIG. 12A described how two levels of instance transforms can be handled by the TTU 738 in hardware without returning to the SM 732. FIG. 17 is a flowchart of an example processing flow in the SM 732 and the TTU 738 when traversing a path with more than two levels of transforms in the BVH. For example, the traversal may include transform from the world space to a first alternate world space, from the first alternate world space to a second alternate world space, and from the second alternate world space to an object space. Each transform is represented by an instance node in the acceleration structure specifying the transform from the coordinate space above that instance node to the coordinate space below.

In this embodiment, considering an instance node specifying a transform, the portion of the acceleration structure above is considered as the TLAS and the portion below is considered as the BLAS. That is, the traversal state for the TLAS is used for the traversal of the BVH portion above the instance node, and the traversal state for the BLAS is used for the traversal of the BVH portion below the instance node. If the root node for the BLAS traversal is an instance node, then the ray is transformed according to the instance node and the traversal is performed. When an instance node is encountered after the root node in the TLAS traversal, the corresponding transform is performed by the TTU and BLAS traversal is commenced. When an instance node is encountered in the BLAS traversal, that transformed ray and stack state is returned to the SM. The SM launches a new query with the transformed ray, and the stack state based on the stack state returned from the TTU to continue the traversal in the TTU.

Consider a BVH path having a root node, an instance node specifying a transform from the world space to the first alternate world space, an instance node specifying a transform from the first alternate world space to the second alternate world space, and an instance node specifying a transform from the second alternate world space to an object space. The SM initiates traversal at step 1702 by launching a query specifying the ray in world space, and a stack initialization complet with the root of the BVH.

The TTU writes the ray information at step 1704 in the world space into the ray state and the stack initialization complet is pushed on the stack in the TLAS. At 1706, the TTU performs traversal in the world space in the TLAS until it reaches the instance node (e.g. until the traversal encounters an InstanceNode hit type) specifying the transform from the world space to the first alternate world space.

At 1708, the TTU transforms the ray from the world space to the first alternate world space and writes the transformed ray in to the ray slot of the BLAS. At 1710, the traversal in the first alternate world space is performed in the BLAS until the instance node specifying the transform from the first alternate world space to the second alternate world space is encountered.

At 1712, the TTU returns the ray state in the first alternate world space and the stack state. Thus, the TTU having traversed two coordinate spaces, returns the ray to the SM to continue traversal.

At 1714, the SM relaunches the ray query specifying the ray in the first alternate world space and a stack initialization complet including the instance node specifying the transform from the first alternate world space to the second alternate world space. As described above, since this includes a top level instance node, the top level flag (top level flag) is set in the stack initialization complet.

At step 1716, the TTU writes the ray that is specified by the SM in first world space to the top ray slot, and pushes the top level instance node entry with the top level flag in the stack in the TLAS. At step 1718, the TTU, based on the tl bit in the stack entry, transforms the ray from the first alternate world space to the second alternate world space, and overwrites the ray state of the TLAS with the transformed ray information. At step 1720, traversal in the second world space occurs in the TLAS until encountering the instance node for the transform from the second alternate world space to the object space.

At step 1722, the TTU transforms the ray from the second alternate world space to the object space according to the instance node, and writes the transformed ray into the ray slot in the BLAS. At step 1724, traversal continues in the object space to detect ray-primitive intersections. At step 1726, information about the ray-primitive intersection tests are transmitted to the SM as described above.

Although this example described a BVH path with three transforms, embodiments are not limited to BVH's of only two level or three levels of transforms. Some embodiments may process any number of levels of transforms by returning to the SM after traversing two coordinate spaces.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 750 illustrated in FIG. 7).

Meanwhile, however, the technology herein provides advantages when used to produce images for virtual reality, augmented reality, mixed reality, video games, motion and still picture generation, and other visualization applications. FIG. 18 illustrates an example flowchart for processing primitives to provide image pixel values of an image, in accordance with an embodiment. As FIG. 18 shows, an image of a 3D model may be generated in response to receiving a user input (Step 1852). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1854). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1856, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1858). Modifying the pixel values may in some applications for example improve the image quality by, for example, applying more realistic reflections and/or shadows. An image is displayed (Step 1860) using the modified pixel values stored in the buffer.

In one example, scan conversion and rasterization of geometric primitives may be implemented using the processing system described above, and ray tracing may be implemented by the SM's 732 using the TTU architecture described in relation to FIG. 10, to add further visualization features (e.g., specular reflection, shadows, etc.). FIG. 18 is just a non-limiting example—the SM's 732 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 738 in some embodiments is stateless, meaning that no architectural state is maintained in the TTU between queries. At the same time, it is often useful for software running on the SM 732 to request continuation of a previous query, which implies that relevant state should be written to registers by the TTU 738 and then passed back to the TTU in registers (often in-place) to continue. This state may take the form of a traversal stack that tracks progress in the traversal of the BVH.

A small number of stack initializers may also be provided for beginning a new query of a given type, for example:

- Traversal starting from a complet
- Intersection of a ray with a range of triangles
- Intersection of a ray with a range of triangles, followed by traversal starting from a complet
- Vertex fetch from a triangle buffer for a given triangle
- Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 738 can return to the SM. Example node types are:

A child complet (i.e., an internal node)

By default, the TTU 738 continues traversal by descending into child complets.

A triangle range, corresponding to a contiguous set of triangles within a triangle buffer (1) By default, triangle ranges encountered by a ray are handled natively by the TTU 738 by testing the triangles for intersection and shortening the ray accordingly. If traversal completes and a triangle was hit, default behavior is for the triangle ID to be returned to SM 732, along with the t-value and barycentric coordinates of the intersection. This is the "Triangle" hit type.

(2) By default, intersected triangles with the alpha bit set are returned to SM 1840 even if traversal has not completed. The returned traversal stack contains the state required to continue traversal if software determines that the triangle was in fact transparent.

(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.

An item range, consisting of an index (derived from a user-provided "item range base" stored in the complet) and a count of items.

By default, item ranges are returned to SM 1840 as an "ItemRange" hit type, consisting of for example an index, a count, and the t-value of the intersection with the leaf bounding box.

An instance node.

The TTU 738 in some embodiments can handle two levels of instancing natively by transforming the ray into the coordinate systems of two instanced BVHs. Additional levels of instancing (or every other level of instancing, depending on strategy) may be handled in software (or in other embodiments, the TTU 738 hardware can handle three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 738.

Additional mode flags may be provided for control handling of alpha triangles.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing acceleration hardware device configured to be connected to a processor, the ray tracing acceleration hardware device comprising:

at least one state storage configured to store a traversal state of an acceleration structure and a ray; and circuitry configured to, using the ray, traverse a traversal path in the acceleration structure from a root node in a first world space to a leaf node in an object space, and during the traversing, in response to a first transform node in the traversal path, update the stored traversal state upon transforming the ray from the first world space to a second world space and, in response to a second transform node in the traversal path, from the second world space to the object space, wherein the first transform node is an instance node that specifies a first transform from the first world space to the second world space and the second transform node is an instance node that specifies a second transform from the second world space to the object space, and wherein the traversing includes transforming the ray according to the first transform and the second transform at respective nodes in the acceleration structure.

2. The ray tracing acceleration hardware device according to claim 1, wherein the transforming the ray from the first world space to the second world space is in accordance with information stored in the acceleration structure.

3. The ray tracing acceleration hardware device according to claim 1, wherein the circuitry is further configured to test the ray, in the object space, for intersection with bounding volumes defined by the acceleration structure.

4. The ray tracing acceleration hardware device according to claim 1, wherein, before the update, the at least one state is initialized based on information received from the processor relating to the ray, defined in the first world space, and the acceleration structure.

5. The ray tracing acceleration hardware device according to claim 1, wherein the circuitry receives the ray and information of the acceleration structure from the processor, wherein the acceleration structure comprises hierarchically arranged nodes defining plural bounding volumes bounding objects in a scene, and wherein the first world space is a coordinate space defined for an application running on the processor, and the object space is a coordinate space in which one of more of the objects in the scene are defined.

6. The ray tracing acceleration hardware device according to claim 1, wherein the ray tracing acceleration hardware device is a coprocessor to the processor.

7. The ray tracing acceleration hardware device according to claim 1, wherein the circuitry is further configured to maintain the traversal state as a top level traversal state and top level ray state for traversing the acceleration structure in the first and second world spaces, and to maintain a bottom level traversal state and bottom level ray state for traversing the acceleration structure in the object space, and wherein the circuitry is further configured to store information about the transformed ray in the top level ray state or the bottom level ray state.

8. The ray tracing acceleration hardware device according to claim 1, configured to, in response to reaching a node of an instance node type in the acceleration data-structure during the traversing, send information about a state of a continued traversing to a processor.

9. The ray tracing acceleration hardware device according to claim 1, wherein the circuitry is part of a server or a data center employed in generating an image, and the image is streamed to a user device.

10. The ray tracing acceleration hardware device according to claim 1, wherein the circuitry is employed in generating an image, and the image is used for training, testing, or certifying a neural network employed in a machine, robot, or autonomous vehicle.

11. A system comprising a processor, a parallel processing unit (PPU) and a traversal coprocessor coupled to a memory, wherein the traversal coprocessor comprises:

at least one state storage configured to store a traversal state of an acceleration structure and a ray; and circuitry configured to, using the ray, traverse a traversal path in the acceleration structure from a root node in a first world space to a leaf node in an object space, and during the traversing, in response to a first transform node in the traversal path, update the stored state upon transforming the ray from a first world space to a second world space and, in response to a second transform node in the traversal path, from the second world space to the object space, wherein the first transform node is an instance node that specifies a first transform from the first world space to the second world space and the second transform node is an instance node that specifies a second transform from the second world space to the object space, and wherein the traversing includes transforming the ray according to the first transform and the second transform at respective nodes in the acceleration structure.

12. The system according to claim 11, wherein the memory is configured to store the acceleration structure of hierarchically-arranged nodes, the hierarchically-arranged nodes defining a plurality of bounding volumes bounding portions of a scene and being axis-aligned in a first coordinate space, and including a plurality of leaf nodes corresponding to surfaces in the scene, the surfaces being in respective object coordinate spaces.

13. The system according to claim 12, wherein the processor is configured to:

access the acceleration structure in the memory; and for each of a plurality of frames containing the scene:

select an alternate world space for the scene; and when the selected world space is different from the first world space, rebuild the acceleration structure in the selected world space and including, for a top level node of the acceleration structure, a transform from the first coordinate space to the selected world space.

14. The system according to claim 13, wherein the PPU is configured to, for each of said plurality of frames containing the scene;

access the rebuilt acceleration structure; and in response to detecting the transform for the top level node, transmit information about the ray in the first world space, the rebuilt acceleration structure, and information about the transform to the traversal coprocessor;

receive intersection information for the ray and the rebuilt acceleration structure from the traversal coprocessor; and render the scene in the frame in accordance with the received intersection information; and wherein the traversal coprocessor is further configured to:

receive said information about the ray, the rebuilt acceleration structure, and information about the transform, wherein the transforming the ray from the first world space to the second world space is in accordance with the received information about the transform; and provide determined one or more intersections to the PPU.

15. A method of testing, in a hardware device configured to accelerate traversal of an acceleration structure, whether a ray intersects a primitive, comprising:

initializing a traversal state stored in the hardware device based on information received from a processor connected to the hardware device, the information comprising an acceleration structure and a ray in a first world space; and traversing, with the ray and by circuitry in the hardware device, a traversal path in the acceleration structure from a root node in the first world space to a leaf node in an object space, and during the traversing, in response to a first transform node in the traversal path, updating the stored state upon transforming the ray from a first world space to a second world space and, in response to a second transform node in the traversal path, from the second world space to the object space, wherein the first transform node is an instance node that specifies a first transform from the first world space to the second world space and the second transform node is an instance node that specifies a second transform from the second world space to the object space, and wherein the traversing includes transforming the ray according to the first transform and the second transform at respective nodes in the acceleration structure.

16. The method of claim 15, wherein the transforming the ray from the first world space to the second world space is performed in accordance with transform information stored in the acceleration structure.

17. The method of claim 15, further comprising maintaining distinct top-level and bottom-level traversal states for world-space and object-space traversals, respectively, and storing information about transformed rays within said distinct states.

18. The method of claim 15, further comprising, in response to reaching a node of an instance node type in the acceleration structure during the traversing, sending information about a state of a continued traversing from the hardware device to the processor.

19. The method of claim 15, further comprising generating an image based on results of the testing, and using the image for training, testing, or certifying a neural network employed in a machine, robot, or autonomous vehicle.

20. A ray tracing acceleration hardware device configured to be connected to a processor, the ray tracing acceleration hardware device comprising:

at least one state storage configured to store a traversal state of an acceleration structure and a ray; and circuitry configured to, using the ray, traverse a traversal path in the acceleration structure from a root node in a first world space to a leaf node in an object space, and during the traversing, update the stored traversal state upon transforming the ray from a first world space to a second world space and from the second world space to the object space, wherein the circuitry receives the ray and information of the acceleration structure from the processor, wherein the acceleration structure comprises hierarchically arranged nodes defining plural bounding volumes bounding objects in a scene, and wherein the first world space is a coordinate space defined for an application running on the processor, and the object space is a coordinate space in which one of more of the objects in the scene are defined.

21. A ray tracing acceleration hardware device configured to be connected to a processor, the ray tracing acceleration hardware device comprising:

at least one state storage configured to store a traversal state of an acceleration structure and a ray; and circuitry configured to, using the ray, traverse a traversal path in the acceleration structure from a root node in a first world space to a leaf node in an object space, and during the traversing, update the stored traversal state upon transforming the ray from a first world space to a second world space and from the second world space to the object space, wherein the circuitry is further configured to maintain the traversal state as a top level traversal state and top level ray state for traversing the acceleration structure in the first and second world spaces, and to maintain a bottom level traversal state and bottom level ray state for traversing the acceleration structure in the object space, and wherein the circuitry is further configured to store information about the transformed ray in the top level ray state or the bottom level ray state.

22. A system comprising a processor, a parallel processing unit (PPU) and a traversal coprocessor coupled to a memory, wherein the traversal coprocessor comprises:

at least one state storage configured to store a traversal state of an acceleration structure and a ray; and circuitry configured to, using the ray, traverse a traversal path in the acceleration structure from a root node in a first world space to a leaf node in an object space, and during the traversing, update the stored state upon transforming the ray from a first world space to a second world space and from the second world space to the object space, wherein the memory is configured to store the acceleration structure of hierarchically-arranged nodes, the hierarchically-arranged nodes defining a plurality of bounding volumes bounding portions of a scene and being axis-aligned in a first coordinate space, and including a plurality of leaf nodes corresponding to surfaces in the scene, the surfaces being in respective object coordinate spaces, wherein the processor is configured to:

access the acceleration structure in the memory; and for each of a plurality of frames containing the scene:

select an alternate world space for the scene; and when the selected world space is different from the first world space, rebuild the acceleration structure in the selected world space and including, for a top level node of the acceleration structure, a transform from the first coordinate space to the selected world space.

* * * * *